(12) United States Patent
Saitoh et al.

(10) Patent No.: US 6,567,886 B1
(45) Date of Patent: May 20, 2003

(54) DISK DRIVE APPARATUS AND CONTROL METHOD THEREOF

(75) Inventors: Hirofumi Saitoh, Chigasaki (JP); Kazunori Inoue, Ebina (JP); Ryoji Fukuhisa, Machida (JP)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 09/692,260

(22) Filed: Oct. 19, 2000

(51) Int. Cl.[7] .............................................. G06F 12/00
(52) U.S. Cl. ...................... 711/111; 711/158; 711/167
(58) Field of Search ........................ 711/111, 112, 113, 711/114, 158, 167

(56) References Cited

U.S. PATENT DOCUMENTS

| | | | | |
|---|---|---|---|---|
| 5,729,718 A | * | 3/1998 | Au ............................. | 711/167 |
| 5,845,318 A | * | 12/1998 | Rose et al. .................. | 711/112 |
| 5,937,433 A | * | 8/1999 | Lee et al. ................... | 711/158 |
| 5,991,825 A | * | 11/1999 | Ng .............................. | 710/39 |
| 6,092,149 A | * | 7/2000 | Hicken et al. .............. | 711/113 |
| 6,092,154 A | * | 7/2000 | Curtis et al. ................ | 711/113 |
| 6,161,165 A | * | 12/2000 | Solomon et al. ........... | 711/114 |
| 6,339,811 B1 | * | 1/2001 | Gaertner et al. ........... | 711/112 |
| 6,311,256 B2 | * | 10/2001 | Halligan et al. ........... | 711/151 |
| 6,418,510 B1 | * | 7/2002 | Lamberts .................... | 710/43 |

* cited by examiner

Primary Examiner—Matthew Kim
Assistant Examiner—Pierre-Michel Bataille
(74) Attorney, Agent, or Firm—Abdy Raissinia; Bracewell & Patterson, L.L.P.

(57) ABSTRACT

A disk drive apparatus and control method thereof that enable the latency that may occur in a multi-drive environment to be prevented, and performance to be improved.

A microprogram is provided that includes a queue handler that stores commands issued by the host in a queue area, performs reordering and determines the command to be executed, and requests execution of the determined command; an interface handler that executes interface-side processing, including data transfer between the host and the drive apparatus by means of a command for which execution has been requested; and a drive handler that executes drive-side processing by means of a command for which execution has been requested, and requests the drive apparatus to perform read/write operations relating to command execution; interface-side processing and drive-side processing are separated with regard to command processing, and interface-side processing does not affect the start of drive-side processing.

13 Claims, 15 Drawing Sheets

Example of cache memory (Command QUEUE) structure

DISK DRIVE APPARATUS AND CONTROL METHOD THEREOF

BACKGROUND OF THE INVENTION

1. Technical Field

The present invention relates to a disk drive apparatus used in a hard disk drive (HDD), etc., and control method therefor, and relates in particular to a disk drive apparatus for high-speed data transfer in a multi-drive environment, and control method therefor.

2. Description of the Related Art

In order to increase access speed, a hard disk drive (HDD) used as an auxiliary storage device for information processing equipment is generally provided with cache memory that temporarily holds data supplied from the information processing equipment (referred to below as the host), or that temporarily holds data read from the magnetic disk until it is transferred to the host, and a controller that performs cache control.

When write data is supplied from the host, the controller holds the supplied write data in the cache memory, then releases the host from write processing. In parallel with this, the controller performs write-system control in which the write data held in the cache memory is sequentially written to the magnetic disk (referred to below as the medium). Also, when there is a read request from the host, the controller instructs the read system to read the expected data from the medium, and holds the data that is read in the cache memory. Then, when there is a read request from the host, if the data to be read is held in the cache memory, it is supplied to the host. By performing this kind of cache control, the apparent access speed of the HDD is increased.

In the small HDDs of recent years, the trend is to use a technique for minimizing the intervention of the HDD's microprocessor (referred to below as the local MPU) in host interface peripheral processing as a means of improving performance by decreasing command overhead, and using hardware implementation of this processing by the host interface controller (HIC) as much as possible.

One possible technique of this kind is the use of a system in which data transfer between the host and cache memory can be performed under HIC control without local MPU intervention, while data transfer between the medium and cache memory requires intervention by the local MPU, which performs data transfer by controlling the hard disk controller (HDC).

The operation for writing data to the medium by means of a write command from the host in this kind of system will be described below.

(1) Once data from the host enters the cache memory via the HIC, the HIC informs the local MPU that a command has arrived from the host. On receiving this information, the local MPU issues an instruction to the HDC to write data in the cache memory to the medium. In response to this instruction, the HDC transfers cache memory data to the medium, and the data is written to the medium.

(2) After this, the HIC issues a notification to the local MPU indicating that transfer to the cache memory from the host has finished, and the HDC issues a notification indicating that writing to the medium has finished.

The operation of the HIC and the local MPU will now be described in greater detail. When the HIC receives a command from the host, it immediately starts data transfer to the cache memory without the intervention of the local MPU, and notifies the local MPU. When this data transfer ends, and as soon as there is space (for example, one block) allowing the next write command to be received in the cache memory, the HIC notifies the local MPU of the end of the command. This notification is to enable the next write command to be latched in the cache memory as soon as it arrives, and is an IDE (Integrated Device Electronics) interface specification.

In this kind of operation, when there is enough space in the cache memory, the HIC independently gives the host an end notification without regard to write processing operations by the local MPU, accepts the next write command from the host, and performs data transfer based on the next write command. Latching as many write commands as possible in the cache memory in this way enables performance to be further improved. In order to perform the above operations, a command queue is provided in the cache memory to hold the various kinds of cache memory commands.

FIG. 9 is a drawing showing the structure of the cache memory command queue. In FIG. 9, Q=1, 2, . . . , n are queue addresses, and A, B, C, D, . . . , N are commands held in the cache memory. As shown in FIG. 9, commands cached in the cache memory are written in the command queue as A, B, . . . , in order, starting with the oldest command. Queue addresses increase each time a command is accepted, and decrease when the old commands are executed sequentially. Command queue management is performed by the HIC, and the local MPU can take in queue address commands.

Write commands held in the command queue are executed by the HDC in response to a write directive from the local MPU to the HDC, and are written to the medium. Data read from the medium is transferred to the cache memory by the HDC, and then transferred to the host by the HIC.

The disk drive apparatus is provided with memory called a sector buffer, and in order to speed up sequential reads, even though an area read requested by one read command ends, the following area read is proceeded with ("look-ahead"). Thus, in the case of sequential reads, data is already present in the cache memory when the next read command arrives, enabling higher speed to be achieved. The serial number assigned to a usable sector is called the LBA (logical block address).

Also, a hard disk apparatus generally has a "reorder" function that rearranges the execution order of queued commands in order to minimize read/write head movement. The hard disk apparatus places commands received from the host in a queue, and changes the command execution order so that this command list is executed most efficiently and speedily on the logical unit.

That is to say, when data read/writes for multiple sectors are issued to the hard disk apparatus from the host, if sectors were read in the order in which the commands are issued, the head would make numerous two-way moves on the disk, which would be time consuming. Therefore, the order of the commands is changed so as to read/write the sectors according to a schedule that minimizes the amount of head movement. In this case, a schedule is established that takes account not only of the amount of head movement, but also of disk latency and head switching time. The schedule that decides this command order is determined by RPO (rotational position optimization).

FIG. 10 is a block diagram showing the configuration of a hard disk apparatus including the software (microprogram) that implements the above described command processing.

In FIG. 10, reference numeral 1 denotes the host interface controller (HIC); reference numeral 2 denotes a drive apparatus that controls HDD drive operations, including control of the voice coil motor (VCM) that drives the actuator mechanism and of the hard disk controller (HDC); reference numeral 3 denotes the interface event handler (I/F event handler); reference numeral 4 denotes the queue handler; reference numeral 5 denotes the command handler (Cmd handler); and reference numeral 6 denotes the drive event handler.

The HIC 1 and the drive apparatus 2 are configured by means of hardware. The interface event handler 3, queue handler 4, command handler 5, and drive event handler 6 are control routines that have functions determined by the microprogram, and are executed by the MPU.

The interface event handler 3 processes events from the HIC 1, and conveys those events to the queue handler 4 or command handler 5. When the HIC 1 receives a command, it stores it in a queue area.

When a number of commands are stored in the queue area, the queue handler 4 performs reordering so that the command list is executed most efficiently and speedily, and determines the command to be executed by the command handler 5. Thereafter, the queue handler 4 requests the command handler 5 to execute the determined command. When the command has been executed by the command handler 5, if there is another command to be executed, the command handler 5 is requested to execute that command.

The command handler 5 executes commands for which execution is requested by the queue handler 4, issues drive apparatus 2 read/write requests to the drive apparatus 2, and issues interface (I/F) control requests to the HIC 1. In this way, the command handler 5 processes drive and I/F related events.

The drive event handler 6 processes events from the HDC of the drive apparatus 2, and conveys events to the command handler 5.

Next, command processing by the above described microprogram will be described.

FIG. 11 is a flowchart showing the control routine of the queue handler 4 in the above described microprogram. Reference characters ST in the figure denote an individual processing step.

First, in step ST1 it is judged whether or not there are commands awaiting execution in the queue area. If there are commands awaiting execution, reordering is performed in step ST2 so that the command list is executed most efficiently and speedily, and then the routine proceeds to step ST3.

If there are no commands awaiting execution, or when reordering has been performed, the command handler 5 judges in step ST3 whether there is a command that is being executed. If a command is being executed, the routine goes back to step ST1; if no command is being executed, the routine proceeds to step ST4.

In step ST4, it is judged whether or not the command to be executed has been determined. If the command to be executed has not been determined, the routine goes back to step ST1. If the command to be executed has been determined, a command execution request is made to the command handler 5 in step ST5, and the routine goes back to step ST1.

FIG. 12 is a flowchart showing the control routine of the command handler 5 in the above described microprogram.

The program starts at the start of command execution. First, in step ST11 it is judged whether or not there is an interface related event (I/F event), and if there is an I/F event, I/F event processing is performed in step ST12, and the routine proceeds to step ST13.

If there is no I/F event, or when I/F event processing has been performed, in step ST13 it is judged whether or not there is a drive related event (drive event), and if there is a drive event, drive event processing is performed in step ST14, and the routine proceeds to step ST15.

If there is no drive event, or when drive event processing has been performed, in step ST15 it is judged whether or not all I/F and drive processing has ended. If all I/F and drive processing has not ended, the routine goes back to step ST11 and the above described processing is repeated; if all I/F and drive processing has ended, processing of this command is ended.

The queued random operations of a hard disk apparatus that has the above described configuration will now be described below. In these queued random operations, the order of commands to be executed is determined by RPO.

FIGS. 13 to 16 are drawings showing the timing of interface-side and drive-side command processing and transfer in queued random operations. Of the queued random operations, FIGS. 13 and 14 show read operations, and FIGS. 15 and 16 show write operations. Also, FIGS. 13 and 15 show operations in a single-drive environment in which a single hard disk apparatus is connected to the host via a SCSI (Small Computer System Interface) bus, while FIGS. 14 and 16 show operations in a multi-drive environment in which a plurality of hard disk apparatuses are connected to the host.

FIG. 17 is a drawing to explain a hard disk apparatus multi-drive environment; FIG. 17A shows the case where a single hard disk apparatus is connected to the host via a bus, and FIG. 17B shows a multi-drive environment in which a plurality of hard disk apparatuses are connected to the host via a SCSI bus. In FIG. 17, SCSI2, an extended SCSI, is used. FIG. 17B shows a multi-drive environment in which hard disk apparatuses are connected; peripheral devices connected to SCSI2 may also include CD-R drives and MO drives, for example. Data read/write operations are performed between any of these disk apparatuses and the host via the SCSI2 bus.

Also, if RAIDs (redundant arrays of inexpensive disks) are provided with the host as a server, a plurality of hard disk drive apparatuses are connected, and appear to be a single drive. This kind of disk array control method is described in Published Unexamined Patent Application No. 5-289818 and National Publication of International Patent Application No. 8-501643.

Current queued random operations are processed as shown in FIGS. 13 to 16.

When the host makes a request for data transfer to the drive-side, as shown in the read operation in FIG. 13, in the drive-side processing the command 1 (CMD1) data after queuing is the object of a seek, and is read from the disk and stored in a buffer; then this read data is sent to the host by data transfer in the interface (I/F)-side processing (see FIG. 13*a*.), and the CMD1 data read ends. The host issues a new command (here, CMDm) (see FIG. 13*b*.).

Regarding the next command, as reordering has ended and a new command (here, CMD2) has been decided, the command 2 (CMD2) data after queuing is the object of a seek, and is read from the disk and stored in a buffer (see FIG. 13*c*.); then this read data is sent to the host by data transfer in the interface (I/F)-side processing. The RPO algorithm is designed on the basis of a predetermined time from the end of CMD1 until the CMD2 seeks begin.

Thus, in a read operation, if only one hard disk drive apparatus is connected to the bus, data transfer is performed smoothly, and a series of commands are completed within the time predicted by RPO.

Also, as shown in the write operation in FIG. 15, in the case of writes, unlike the above described read operation, writing is not possible unless data arrives. Also, status and message (status & MSG) confirmation is involved.

On the drive side, if execution of command 1 (CMD1) is performed internally, data is required for CMD1 execution, so a reselection or "resel" is applied to the host side (see FIG. 15a.). As this is a write reselection or "resel", data from the host is transferred (see FIG. 15b.), on the drive side a seek of the transferred data is performed, and after a latency wait, the data is written to the disk (see FIG. 15c.). When data writing ends, a command end status and status message are sent to the host as shown in FIG. 15d.

The host issues a new command (here, CMDn) (see FIG. 15e.). Reordering for the next command ends and a new command (here, CMD2) is decided.

Thus, in a write operation, if only one hard disk drive apparatus is connected to the bus, data transfer is performed smoothly, and a series of commands are completed within the time predicted by RPO.

However, with hard disk drive apparatuses that employ a technique for performing conventional queued random operations of this kind, there are limitations on improvement of performance for the reasons given below.

That is to say, if only one hard disk drive apparatus is connected to the bus, as shown in FIG. 17A, data transfer is performed smoothly, and a series of commands are completed within the time predicted by RPO, as illustrated in FIGS. 13 and 15. However, if two or more hard disk drive apparatuses are connected to the bus, as shown in FIG. 17B, it is not always possible for data transfer to start immediately, and a latency arises, causing a drop in performance. This problem will be described in detail below with reference to FIGS. 14 and 16.

FIG. 14 is a chart showing read operations in a multi-drive environment in which two or more hard disk apparatuses are connected to the SCSI bus; other conditions are the same as in the single-drive environment in above mentioned FIG. 13.

As shown in the read operations in a multi-drive environment in FIG. 14, if the bus is not free when data read from the disk by command 1 (CMD1) on the drive side is about to start being transferred by CMD1 on the interface side, CMD1 data transfer will be delayed by time A (see FIG. 14a.), the interval before the bus becomes free. As a result, the start of drive-side processing of the next command, CMD2, is delayed by time A due to the wait for the end of CMD1 interface-side processing, as shown in FIG. 14b. As RPO determines the order of command processing so that the latency will be 0, the delayed start of drive processing causes one-revolution latency (1REV.) as shown in FIG. 14c.

That is to say, the RPO algorithm is designed on the assumption that data transfer will be possible immediately when it is time for it to begin, and therefore, if there is even a slight delay in interface-side data transfer, this slight delay, time A, on the drive side will prevent execution of the next command (seek and read) from being carried out in time, and one-revolution latency will arise in command processing.

A similar problem also occurs in write operations in a multi-drive environment.

FIG. 16 is a chart showing write operations in a multi-drive environment in which two or more hard disk apparatuses are connected to the SCSI bus; other conditions are the same as in the single-drive environment in above mentioned FIG. 15.

As shown in the write operations in a multi-drive environment in FIG. 16, if the bus is not free when data transfer is about to be started by command 2 (CMD2) on the interface side, CMD2 data transfer will not be possible, and will be delayed by time B (see FIG. 16a), the interval before the bus becomes free. As a result, the start of drive-side processing of command CMD2 is delayed by time B due to the wait for the end of CMD2 interface-side processing (storage in the buffer of the data to be written), as shown in FIG. 16b. As RPO determines the order of command processing so that the latency will be 0, the delayed start of interface processing causes one-revolution latency (1REV.) as shown in FIG. 16b.

In a multi-drive environment, as described above, if, when a particular hard disk drive apparatus is not using the bus, another hard disk drive apparatus is using the bus, it is not possible to use the bus immediately, and latencies A and B shown in the above described FIGS. 14 and 16 will arise. The order of command execution in queued random operations is determined by RPO, but as RPO does not take account of cases where the bus cannot be used, there is a problem in that, if the above described unpredicted latency occurs, excessive latency will be incurred in command processing. Moreover, it is not possible to predict to what extent it will not be possible to use the bus, because of the operation of other hard disk drive apparatuses. In addition, peripheral devices that can be connected to a SCSI bus include various kinds of devices other than hard disk drive apparatuses, and a similar problem will occur when these devices use the bus.

The present invention has as its object the provision of a disk drive apparatus and its control method that prevent the latency that may occur in a multi-drive environment, and improve performance.

SUMMARY OF THE INVENTION

The disk drive apparatus of the present invention comprises: a drive controller that controls operations such as reading/writing or the like of data from/to a disk-shaped storage medium; a host interface controller that performs data transfer between the host and the drive controller by means of hardware; and a command manager that stores in a queue area a plurality of commands issued by the host, performs reordering so that a command list is executed most efficiently and speedily, determines the command to be executed, and requests execution of the determined command; and further comprises: interface processing means that executes interface-side processing including data transfer between the host and the drive controller by means of commands for which execution has been requested; and drive processing means that executes drive-side processing by means of commands for which execution has been requested, and issues requests to the drive controller for reading/writing related to command execution; wherein interface-side processing and drive-side processing are performed separately with regard to command processing.

The disk drive apparatus of the present invention may be an apparatus wherein interface-side processing and drive-side processing are separated with regard to command processing, and interface-side processing does not affect the start of drive-side processing.

The disk drive apparatus of the present invention may be an apparatus wherein, when the interface processing means is about to execute interface-side processing according to a first command, the drive processing means starts processing of a second command at the end of drive-side processing of the first command, without regard to execution of processing by the interface processing means.

The disk drive apparatus of the present invention may be an apparatus comprising a plurality of cache segment buffers that store data read from a disk-shaped storage medium by execution of a plurality of commands; wherein the drive processing means stores data read from the disk-shaped storage medium by command execution in a plurality of cache segment buffers, and executes drive-side processing; and the interface processing means executes interface-side processing on data stored in a plurality of cache segment buffers.

The disk drive apparatus of the present invention may be an apparatus comprising a plurality of cache segment buffers that store data to be written to a disk-shaped storage medium by execution of a plurality of commands; wherein the interface processing means starts data transfer to a plurality of cache segment buffers without regard to the processing situation of the drive processing means; and the drive processing means writes write data, that has been transferred to a plurality of cache segment buffers, to the disk-shaped storage medium by means of command execution, and executes drive-side processing.

The disk drive apparatus of the present invention may be an apparatus comprising a plurality of cache segment buffers that store data to be written to a disk-shaped storage medium by execution of a plurality of commands; wherein the interface processing means starts data transfer to a plurality of cache segment buffers without regard to the command processing order determined by the command manager; and the drive processing means writes write data, that has been transferred to a plurality of cache segment buffers, to the disk-shaped storage medium in the command processing order determined by the command manager, and executes drive-side processing.

The interface-side processing executed by the above described interface processing means may be data transfer, and the drive-side processing executed by the above described drive processing means may be read/write processing on a disk-shaped storage medium.

Further, the drive-side processing executed by the above described drive processing means may be processing to write data to a plurality of cache segment buffers, or processing to read data from a plurality of cache segment buffers.

The disk drive apparatus of the present invention may be an apparatus wherein a plurality of commands issued by the host are stored in a queue area, and queued random operations that execute commands are performed.

The disk drive apparatus of the present invention may be an apparatus wherein a plurality of commands issued by the host are stored in a queue area, and queued random operations that execute commands are performed; and the order of the commands executed in the queued random operations is determined by RPO that changes the command execution order so that the command list is executed most efficiently and speedily.

The disk drive apparatus of the present invention may be a disk-drive apparatus that is used in a multi-drive environment, wherein the host and a plurality of peripheral devices are connected by a bus, and data transfer is performed between the host and a peripheral device, or between peripheral devices, by occupying the bus; and the peripheral devices are disk drive apparatuses according to claim 1.

A disk drive apparatus control method of the present invention comprises: a command manager that stores in a queue area a plurality of commands issued by the host, performs reordering so that the command list is executed most efficiently and speedily, determines the command to be executed, and requests execution of the determined command; interface processing means that executes interface-side processing by means of commands for which execution has been requested; and drive processing means that executes drive-side processing by means of commands for which execution has been requested; and comprises, in the queued random read operation that executes read commands: a step in which the drive processing means executes first command processing on the drive side; a step in which, at the end of drive-side first command processing, the interface processing means executes interface-side processing by means of the first command; and a step in which the drive processing means starts second command processing at the end of first command drive-side processing, without regard to execution of first command processing by the interface processing means.

A disk drive apparatus control method of the present invention comprises: a command manager that stores in a queue area a plurality of commands issued by the host, performs reordering so that the command list is executed most efficiently and speedily, determines the command to be executed, and requests execution of the determined command; interface processing means that executes interface-side processing by means of commands for which execution has been requested; and drive processing means that executes drive-side processing by means of commands for which execution has been requested; and comprises, in the queued random read operation that executes read commands: a step in which the drive processing means stores data read from a disk-shaped storage medium by command execution in a plurality of cache segment buffers, and executes drive-side processing; a step in which the interface processing means executes interface-side processing on data stored in a plurality of cache segment buffers; and a step in which the drive processing means sequentially executes processing of the next command without regard to execution of interface-side processing by the interface processing means.

A disk drive apparatus control method of the present invention comprises: a command manager that stores in a queue area a plurality of commands issued by the host, performs reordering so that the command list is executed most efficiently and speedily, determines the command to be executed, and requests execution of the determined command; interface processing means that executes interface-side processing by means of commands for which execution has been requested; and drive processing means that executes drive-side processing by means of commands for which execution has been requested; and comprises, in the queued random write operation that executes write commands: a step in which the interface processing means starts data transfer to a plurality of cache segment buffers without regard to the processing situation of the drive processing means; a step in which the drive processing means writes write data, that has been transferred to a plurality of cache segment buffers, to a disk-shaped storage medium by means of command execution, and executes drive-side processing; and a step of sending a command end status to the host when writing to the disk-shaped storage medium by means of command execution ends.

A disk drive apparatus control method of the present invention comprises: a command manager that stores in a queue area a plurality of commands issued by the host, performs reordering so that the command list is executed most efficiently and speedily, determines the command to be executed, and requests execution of the determined command; interface processing means that executes interface-side processing by means of commands for which execution has been requested; and drive processing means that executes drive-side processing by means of commands for which execution has been requested; and comprises, in the queued random write operation that executes write commands: a step in which the interface processing means starts data transfer to a plurality of cache segment buffers without regard to the command processing order determined by the command manager; a step in which the drive processing means writes write data, that has been transferred to a plurality of cache segment buffers, to a disk-shaped storage medium in the command processing order determined by the command manager, and executes drive-side processing; and a step of sending a command end status to the host when writing to the disk-shaped storage medium by means of command execution ends.

BRIEF DESCRIPTION OF THE DRAWINGS

The novel features believed characterics of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF THE PREFERRED EMBODIMENT

With reference now to the attached drawings, embodiments of the present invention will be described below.

Figure 1:
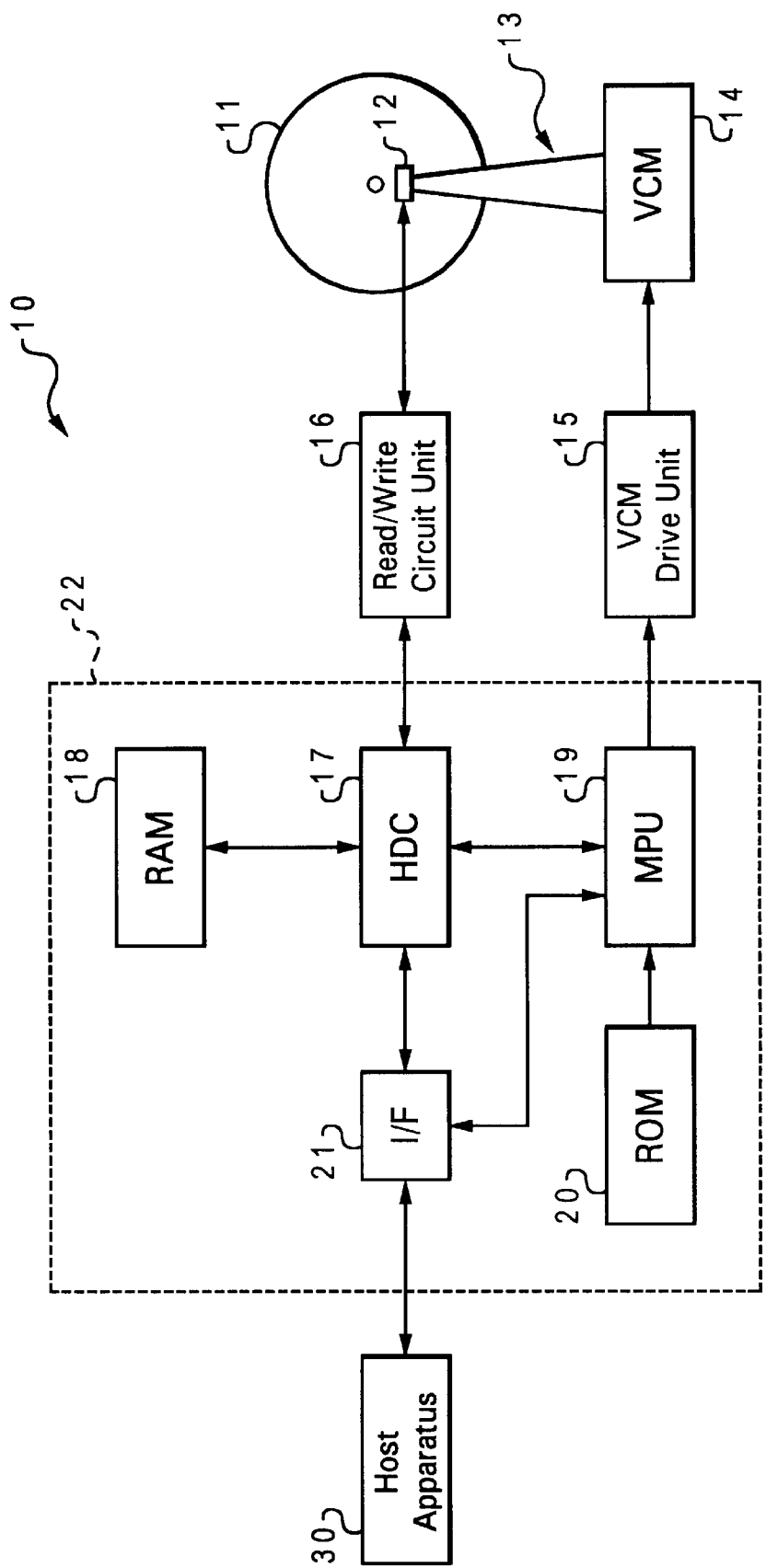
FIG. 1 is a block diagram showing the configuration of a disk drive apparatus according to a first embodiment to which the present invention is applied.

FIG. 1 is a block diagram showing the configuration of a disk drive apparatus according to a first embodiment of the present invention. The first embodiment is an example in which the disk drive apparatus is applied to a hard disk drive apparatus requiring a high transfer speed.

In FIG. 1, hard disk drive (HDD) 10 comprises: a magnetic disk 11 that is the data storage medium; a magnetic head 12 for reading/writing data from/to the magnetic disk 11; an actuator mechanism 13 that moves a head slider that holds magnetic head 12 over the surface of magnetic disk 11 and to the retracted position; a voice coil motor (VCM) 14 that rotates the arm of actuator mechanism 13; a VCM drive unit 15 that drives VCM 14, including a spindle motor that rotates the magnetic disk 11; a read/write circuit unit 16 that controls data reading/writing and that includes a detected signal amplification circuit, waveform-shaping circuit, analog-digital converter (ADC), digital-analog converter (DAC), etc., in modular form; a hard disk controller (HDC) 17 that controls operations such as data reading/writing on magnetic disk 11; RAM 18 that temporarily stores supplied data and also caches record/playback data; an MPU 19 that controls overall HDD operation, including HDC 17 control; ROM 20 that stores a microprogram and data for operating the MPU 19; and an interface (I/F) 21 for connection to an external host apparatus 30 via a bidirectional line.

Also, HDC 17, RAM 18, and MPU 19 are interconnected by means of a data bus, HDC 17 is connected to MPU 19 by a control bus, and HDC 17 is connected to host apparatus 30 external to the HDD via I/F 21.

Magnetic disk 11 can be applied to an embedded servo (sector servo) system in which tracks that contain data areas in which data is recorded and servo areas in which servo data is pre-recorded are arranged concentrically, or to a dedicated servo system in which one surface of the magnetic disk is used only for servo purposes, and only data is recorded on the other surface of the magnetic disk.

The above described HDC 17, RAM 18, MPU 19, ROM 20, and interface 21 control overall HDD operation as a whole, and also configure control unit 22 that controls data input/output from/to the external equipment (host apparatus 30) connected via I/F 21.

The control unit 22 comprises MPU 19 that executes the control program, memory that stores the control program and data such as a defect map showing the location of bad sectors, and so forth.

RAM 18 and ROM 20 are provided as memory, and the control program is stored in ROM 20 or RAM 18. A program to be stored in RAM 18 is stored in a prescribed area on a magnetic disk 11, and is read into RAM 18 and executed at power-on (when a POR (power-on reset) is executed). RAM 18 has a function as cache memory, and has a capacity (for example, 3,584 Kbytes (7,168 blocks)) that allows several hundred or more recording units (sectors) of data to be stored on the magnetic disk.

In the present embodiment, interface-side processing and drive-side processing are separated, and command processing has been modified to enable drive-side processing to be started even if interface-side processing and drive-side processing have not both finished. Consequently, a plurality of buffers for commands (segment buffers) are provided. Normally, there is one segment buffer for one command, but in the present embodiment a corresponding number of segment buffers are provided for a plurality of commands so that the case where only drive-side processing proceeds can also be handled. In hardware, these segment buffers are secured in a prescribed area of RAM 18.

Control unit 22 controls the operation of the entire disk drive apparatus by executing a control program (microprogram), and performs control of reading/writing from/to the magnetic disk 11 on the basis of commands and data supplied from host apparatus 30 via I/F 21.

Also, MPU 19 in control unit 22 can execute a plurality of processes in parallel, one of which is a control process for command and data input/output from/to host apparatus 30, another of which is a write process that writes write data stored in a buffer (RAM 18) to magnetic disk 11, and yet another of which is a read cache process that reads data for which reading is directed by host apparatus 30, or data that is predicted to be read, from magnetic disk 11 (look-ahead), and stores it in a buffer ahead of time. In addition, operations for servo control and processes for error recovery processing, etc., are also executed in parallel.

In the input/output control process that controls input/output from/to host apparatus 30, when a command requesting a data write, an address (for example, logical block address: LBA) indicating the write destination (sector on magnetic disk 11), and the write data, are supplied from host apparatus 30, the control unit 22 stores the supplied write data in a buffer. When a command requesting a data read, and the address (LBA) at which the data to be read is stored, are supplied from host apparatus 30, if the data for which the read request was issued has been read from magnetic disk 11 and stored in a buffer, it is read and supplied to the host apparatus 30; if this data has not been stored in a buffer, an instruction to read the data for which the read request was issued is given to read/write circuit unit 16, and the data that is read is supplied to host apparatus 30.

In the write process, control unit 22 sequentially reads write data supplied from host apparatus 30 and stored in a buffer as described above, supplies it to read/write circuit unit 16, and orders writing to magnetic disk 11.

In the read cache process, when there is a read request from host apparatus 30 to read/write circuit unit 16, control unit 22 orders a read of the expected data, and stores the data that is read in a buffer.

Figure 17A:
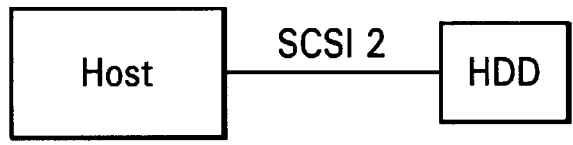
FIG. 17 is a drawing to explain the conventional hard disk apparatus multi-drive environment.
Figure 17B:
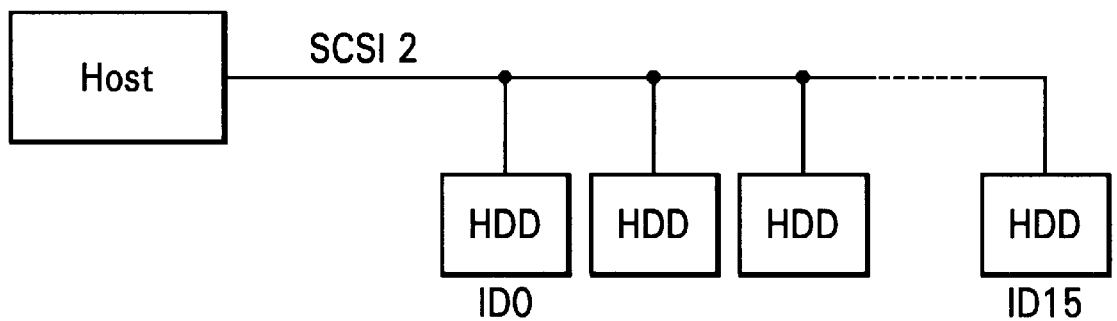

The above described magnetic disk apparatus 10 is taken to be an apparatus used in a multi-drive environment in which it is connected to host apparatus 30 as one of a plurality of disk apparatuses by means of a SCSI interface (for example, SCSI2) as shown in the above described FIG. 17B.

In the above described disk drive apparatus configuration example, a characteristic of the present invention lies in the software that implements command processing, for example. That is to say, the microprogram that determines the command order by means of RPO is optimized in a multi-drive environment.

Figure 2:
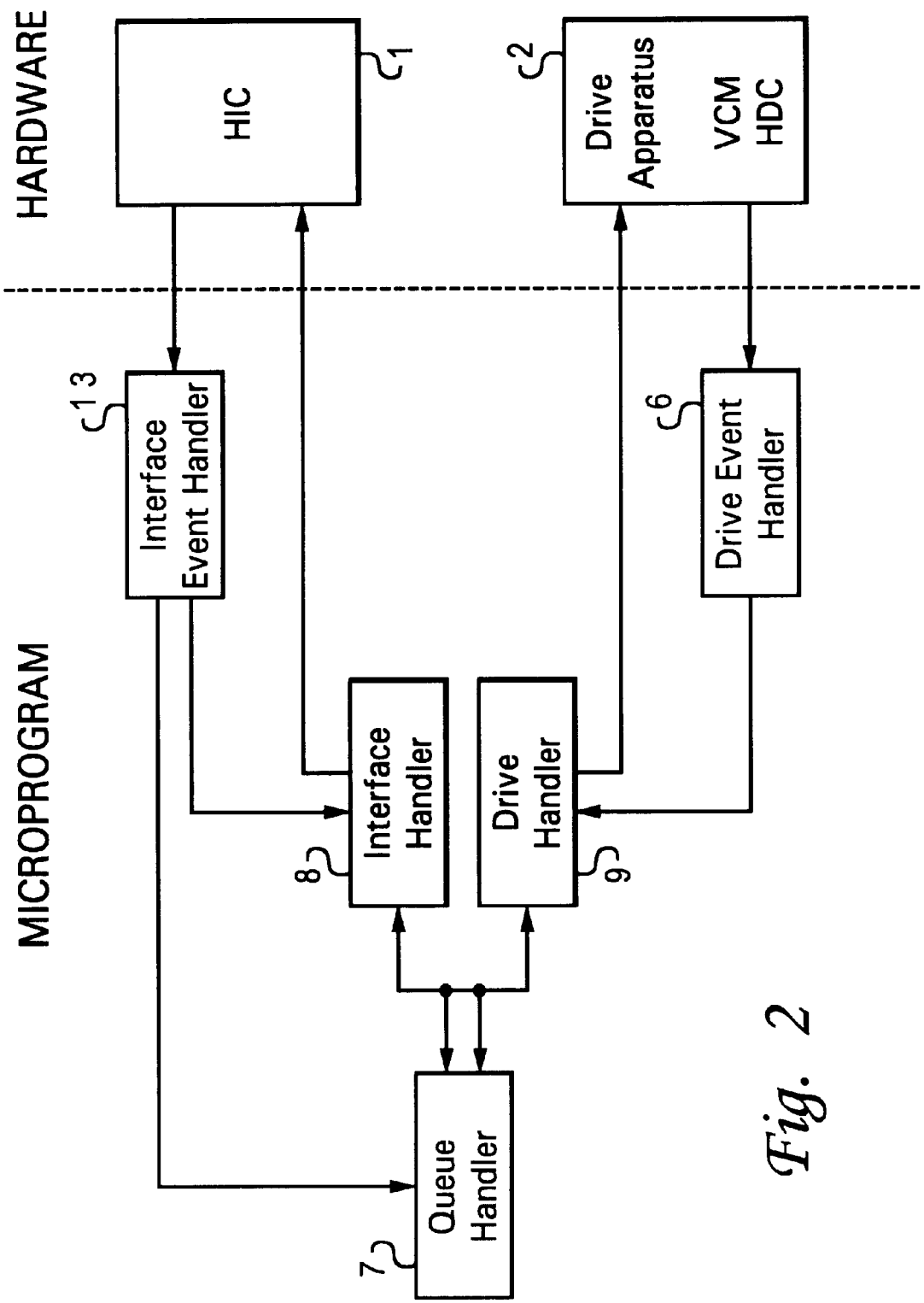
FIG. 2 is a block diagram showing the configuration of a hard disk apparatus that includes software (a microprogram) that implements command processing of the above described disk drive apparatus.

FIG. 2 is a block diagram showing the configuration of a hard disk apparatus that includes software (a microprogram) that implements the above described command processing. In the description of FIG. 2, the same reference numerals are used for the same configuration components as in the above described FIG. 10.

In FIG. 2, reference numeral 1 denotes the host interface controller (HIC) that performs host interface peripheral processing by means of hardware; reference numeral 2 denotes a drive apparatus (drive controller) that controls HDD drive operations, including control of the voice coil motor (VCM) that drives the actuator mechanism and of the hard disk controller (HDC); reference numeral 3 denotes the interface event handler (I/F event handler); reference numeral 7 denotes the queue handler (command manager); reference numeral 8 denotes the interface handler (I/F handler) (interface processing means); reference numeral 9 denotes the drive handler (drive processing means); and reference numeral 6 denotes the drive event handler.

The HIC 1 and drive apparatus 2 are configured by means of hardware. The interface event handler 3, queue handler 7, interface handler 8, drive handler 9, and drive event handler 6 are control routines that have functions determined by the microprogram, and are executed by the MPU.

Figure 10:
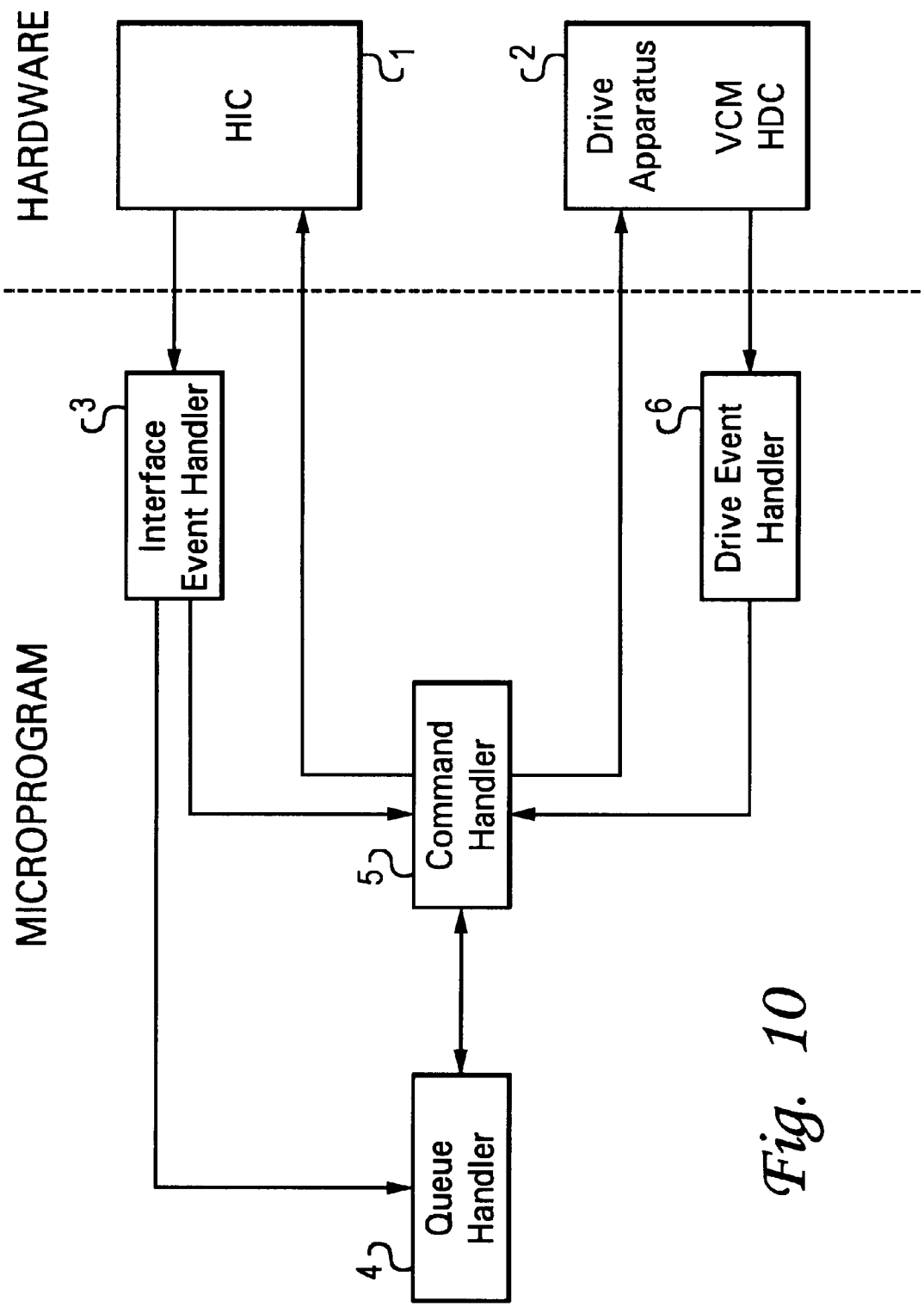
FIG. 10 is a block diagram showing the configuration of a hard disk apparatus including the software (microprogram) that implements command processing in the conventional disk drive apparatus.
Figure 12:
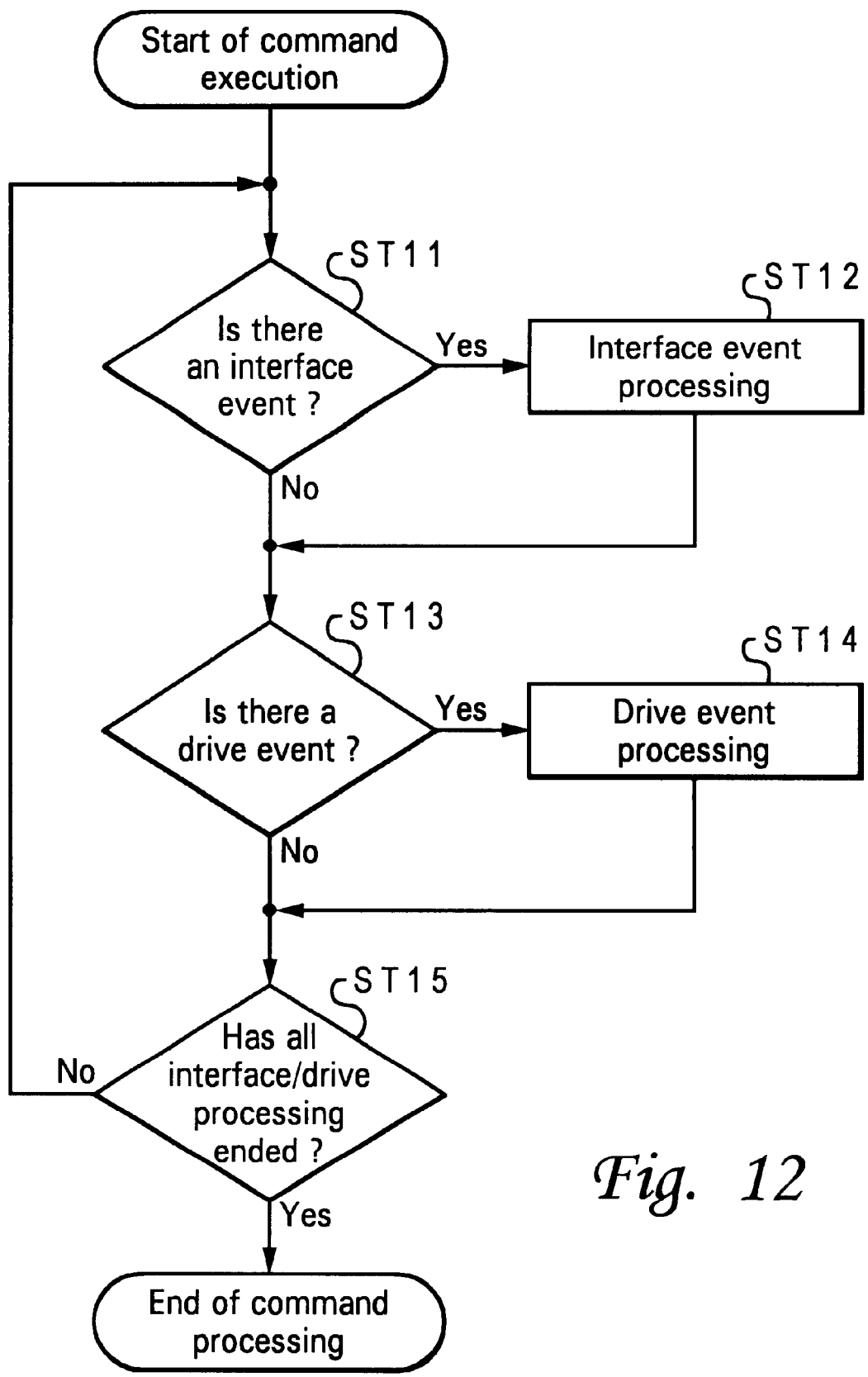
FIG. 12 is a flowchart showing the command handler control routine of the conventional disk drive apparatus.
Figure 13:
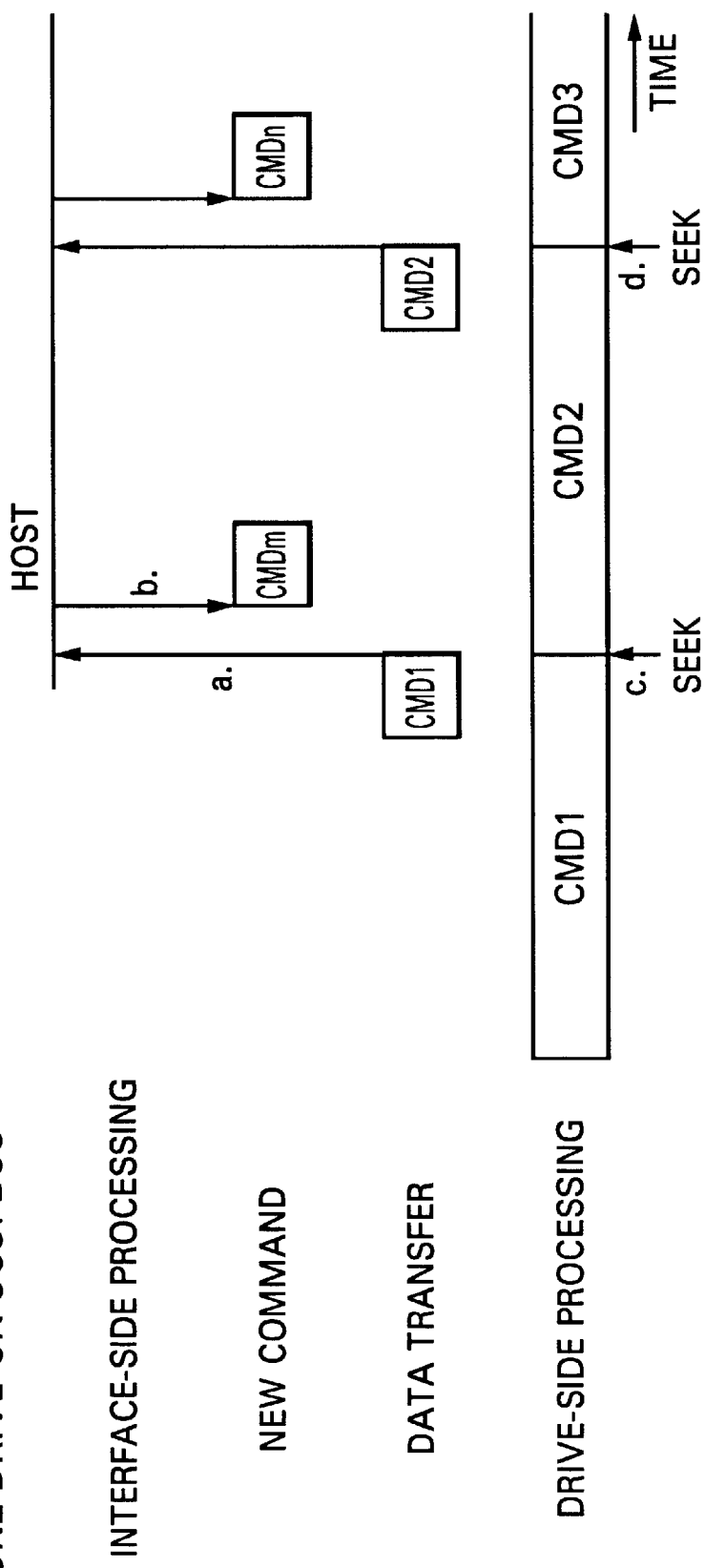
FIG. 13 is a chart showing the timing of interface-side and drive-side command processing and transfer in read operations in the conventional disk drive apparatus.

The microprogram that implements command processing of a hard disk apparatus according to the present invention is a microprogram wherein command handler 5 in the above described FIG. 10 is replaced with an interface handler 8 and drive handler 9, and queue handler 7 can control interface handler 8 and drive handler 9 individually.

The interface event handler 3 processes events from the HIC 1, and conveys those events to the queue handler 7 or interface handler 8. When the HIC 1 receives a command, it stores it in a queue area.

When a number of commands are stored in the queue area, the queue handler 7 performs reordering so that the command list is executed most efficiently and speedily, and determines the command to be executed by interface handler 8 and drive handler 9. The queue handler requests interface handler 8 and drive handler 9 to execute the determined command. When execution of interface related operations for the command by interface handler 8 ends, if there are interface related operations for the next command to be executed, interface handler 8 is requested to execute these. Also, when execution of drive related operations for the command by drive handler 9 ends, if there are drive related operations for the next command to be executed, drive handler 9 is requested to execute these. When the necessary interface and drive operations for a particular command end, processing of that command is ended.

Interface handler 8 requests the HIC 1 to perform interface control relating to execution of a command for which execution has been requested by queue handler 7, and also processes interface related events.

Drive handler 9 requests drive apparatus 2 to perform reading/writing relating to execution of a command for which execution has been requested by queue handler 7, and also processes drive related events.

Drive event handler 6 processes events from the HDC of drive apparatus 2, and conveys those events to drive handler 9.

At the same time, HIC 1 is connected to a host external to the HDD by means of a SCSI bus. This HIC 1 corresponds to the control unit 22 and I/F 21 in FIG. 1. Also, RAM 18 of control unit 22 in the above described FIG. 1 has a function as a sector buffer, and can store several hundred or more recording units (sectors) of data on the magnetic disk. Moreover, HIC 1 has internal memory that can store all the information necessary for data transfer, and performs data transfer between the host and RAM 18 by means of hardware without the intervention of MPU 19 (FIG. 1). When write data is supplied from the host, HIC 1 stores the supplied write data in RAM 18, and then releases the host from write processing. Also, the fact that a command has arrived from the host is reported to MPU 19 from the HIC 1. When the HIC 1 reports command information from the host and hit information for that command, MPU 19 controls HIC 1 on the basis of this information.

The operation of a disk drive apparatus configuration as described above will now be described below, but first, the basic concept of the present invention will be explained.

Conventionally, in command processing, the next drive-side processing is not started until interface-side processing and drive-side processing have ended. Consequently, in a multi-drive environment latency may arise because the bus is not free.

Thus, the present invention (1) provides for interface-side processing such as data transfer and drive-side processing such as disk reads/writes to be performed separately in queued random operations of a disk drive apparatus. That is to say, interface-side processing and drive-side processing are separated, and interface-side processing, which cannot be predicted in a multi-drive environment, does not affect drive-side processing. (2) Also, since the time during which another disk drive apparatus occupies the bus affects the time during which multiple commands of a particular disk drive apparatus are processed, the configuration provides for a number of cache segments to be included. By this means, it is possible to prevent the latency that may arise in a multi-drive environment, and to improve performance.

Next, the operation of a disk drive apparatus based on the above described basic concept will be described in detail.

First, command processing by the microprogram shown in FIG. 2 will be described with reference to FIGS. 3 to 5.

Figure 3:
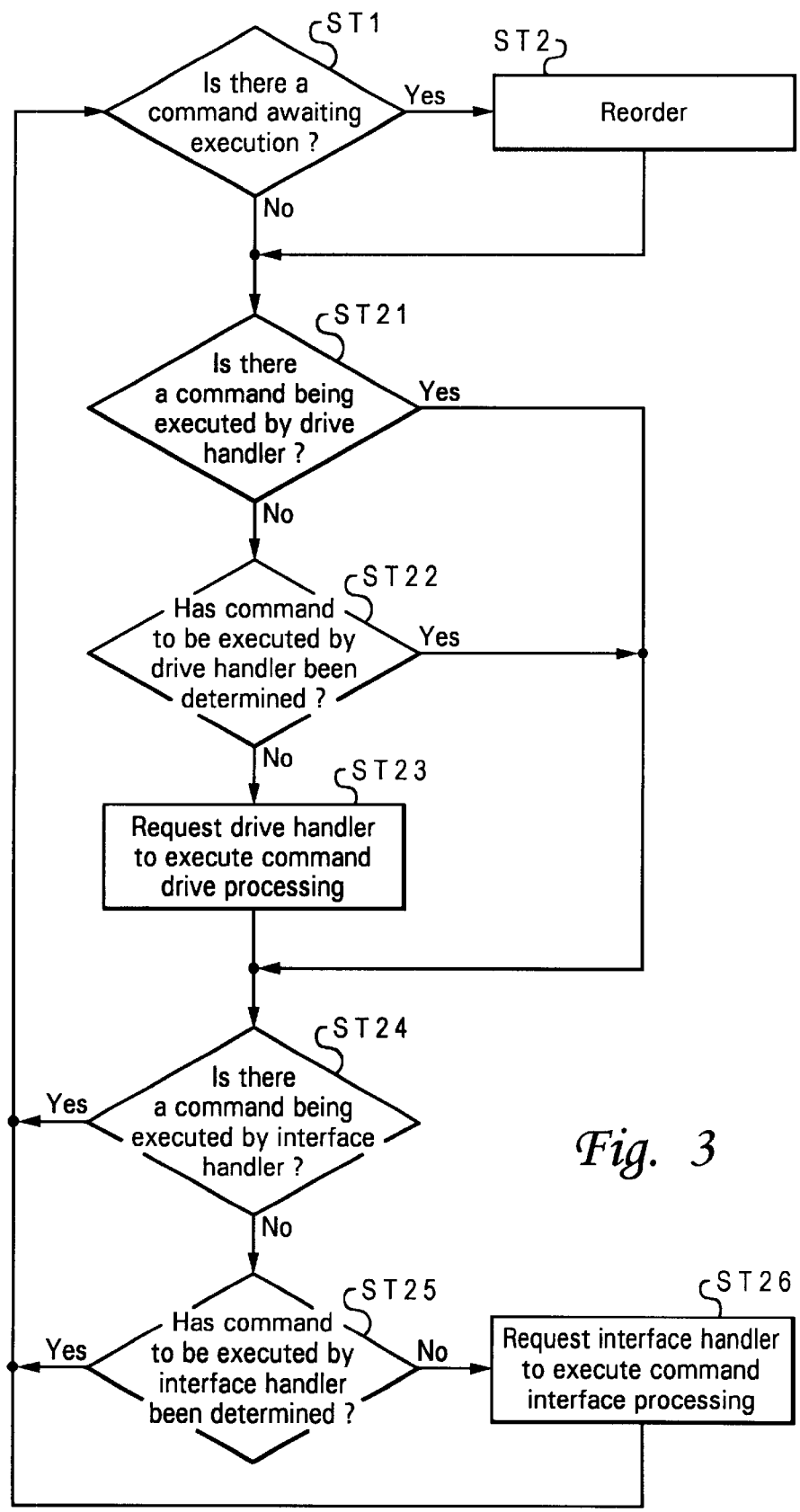
FIG. 3 is a flowchart showing the queue handler control routine of the microprogram of the above described disk drive apparatus.
Figure 11:
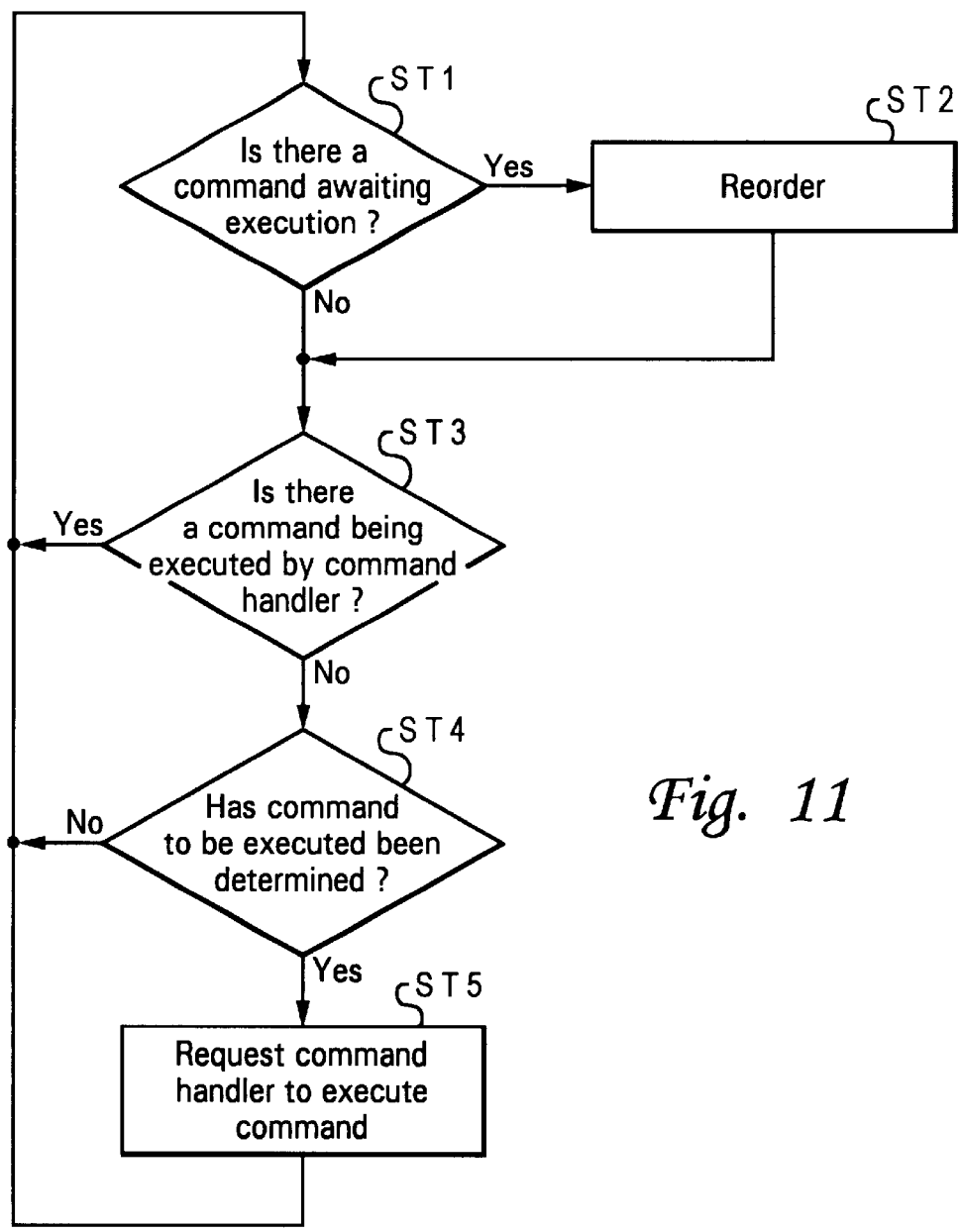
FIG. 11 is a flowchart showing the queue handler control routine of the conventional disk drive apparatus.

FIG. 3 is a flowchart showing the control routine of the queue handler 7 in the microprogram. The same reference characters and numerals are used for the same processing steps as in the above described FIG. 11.

First, in step ST1 it is judged whether or not there are commands awaiting execution in the queue area. If there are commands awaiting execution, reordering is performed in step ST2 so that the command list is executed most efficiently and speedily, and then the routine proceeds to step ST3. The queue handler 7 creates a list of command information to be executed when reordering is carried out. This command information includes a place for storing the drive processing situation and interface processing situation of the its own commands. There is also a place for storing a pointer that indicates the command information to be executed next.

If there are no commands awaiting execution, or when reordering has been performed, it is judged in step ST21 whether or not there is a command that is being executed by drive handler 9. If no command is being executed, it is judged in step ST22 whether or not the command to be executed by drive handler 9 has been determined.

If the command to be executed by drive handler 9 has been determined, in step ST23 drive handler 9 is requested to execute command drive processing, and the routine proceeds to step ST24.

On the other hand, if there is a command awaiting execution in the above described step ST21, or if the command to be executed by drive handler 9 has not been determined in step ST22, the command drive processing execution state is judged not to be in effect, and the routine proceeds to step ST24.

In step ST24, it is judged whether or not there is a command that is being executed by the interface handler 8. If no command is being executed, it is judged in step ST25 whether or not the command to be executed by interface handler 8 has been determined.

If the command to be executed by interface handler 8 has not been determined, a command interface processing execution request is made to the interface handler 8 in step ST26, and the routine goes back to step ST1.

If there is a command awaiting execution in the above described step ST24, or if the command to be executed by interface handler 8 has been determined in the above described step ST25, the command interface processing execution state is judged not to be in effect, and the routine goes back directly to step ST1.

Figure 4:
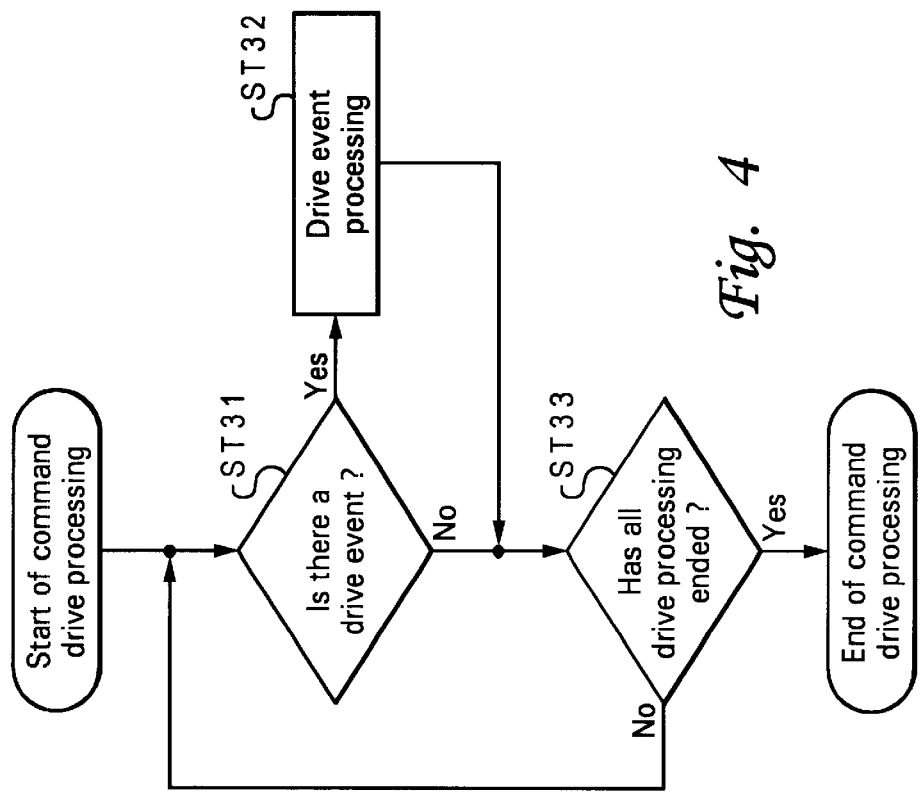
FIG. 4 is a flowchart showing the drive handler control routine of the microprogram of the above described disk drive apparatus.

FIG. 4 is a flowchart showing the control routine of the drive handler 9 in the above described microprogram.

The program starts at the start of command drive processing. First, in step ST31 it is judged whether or not there is a drive related event (drive event), and if there is a drive event, drive event processing is performed in step ST32, and the routine proceeds to step ST33.

If there is no drive event, or when drive event processing has been performed, in step ST33 it is judged whether or not all drive processing has ended. If all drive processing has not ended, the routine goes back to step ST31 and the above described processing is repeated; if all drive processing has ended, drive processing for this command is ended.

In this way, drive handler 9 determines its processing according to the command drive processing situation and events that occur.

Figure 5:
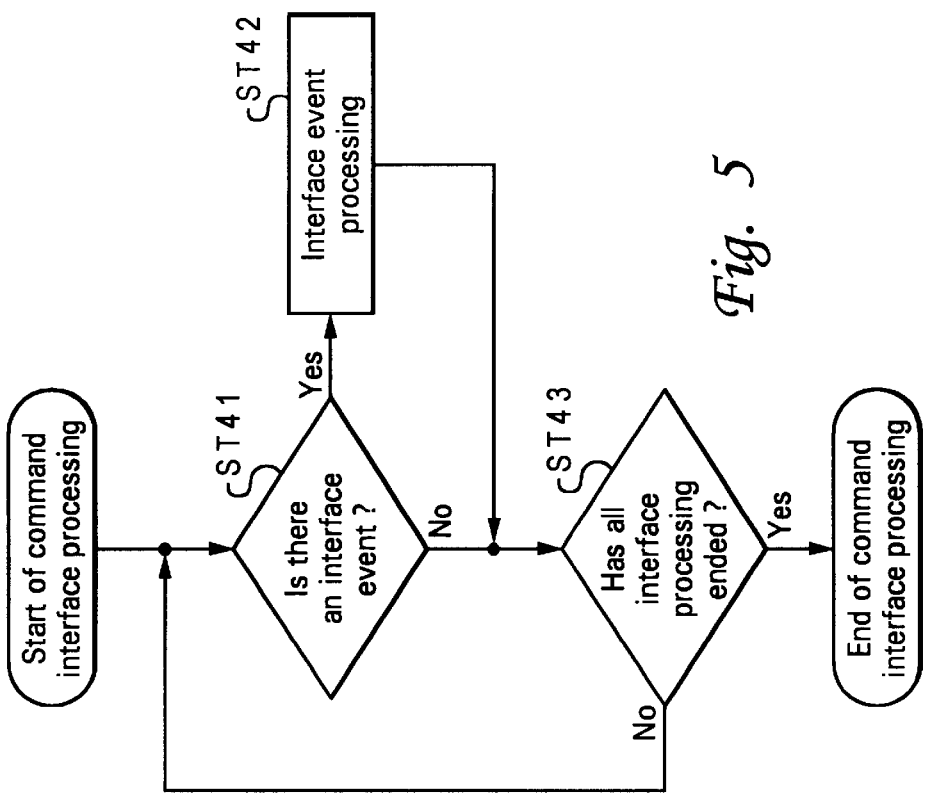
FIG. 5 is a flowchart showing the interface handler control routine of the microprogram of the above described disk drive apparatus.

FIG. 5 is a flowchart showing the control routine of interface handler 8 in the above described microprogram.

The program starts at the start of command interface processing. First, in step ST41 it is judged whether or not there is an interface related event (interface event), and if there is an interface event, interface event processing is performed in step ST42, and the routine proceeds to step ST43.

If there is no interface event, or when interface event processing has been performed, in step ST43 it is judged whether or not all interface processing has ended. If all interface processing has not ended, the routine goes back to step ST41 and the above described processing is repeated; if all interface processing has ended, interface processing for this command is ended.

In this way, interface handler 8 determines its processing according to the command interface processing situation and events that occur.

The queued random operations of a hard disk apparatus that has the above described configuration will now be described below. In these queued random operations, the order in which commands are to be executed is determined by RPO.

Figure 6:
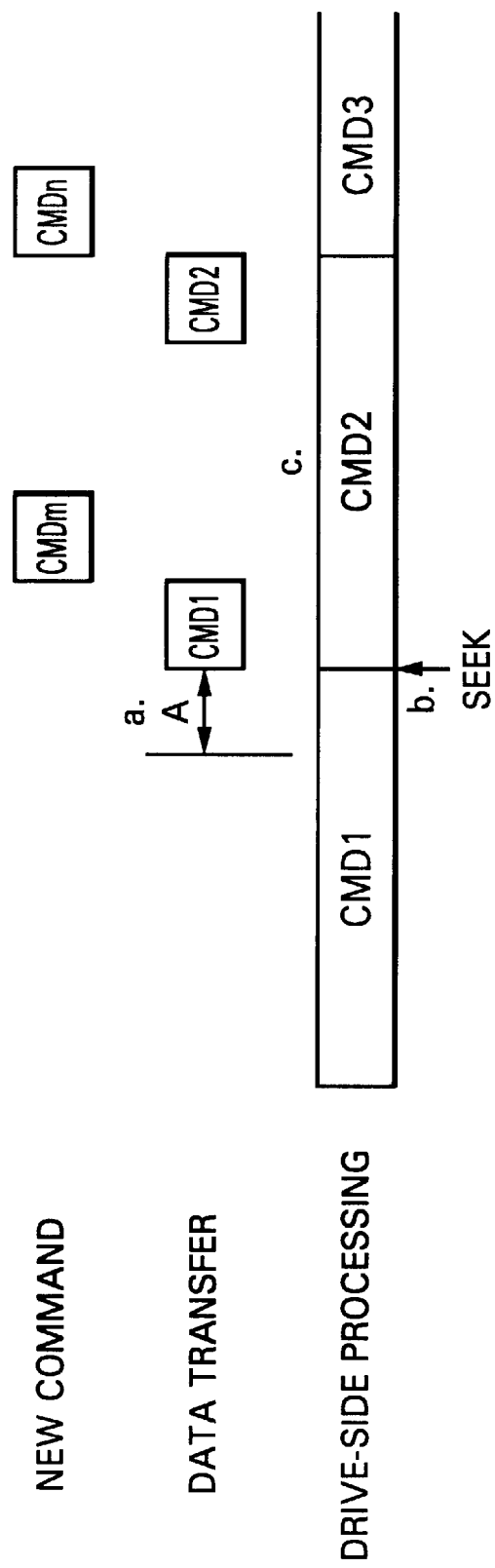
FIG. 6 is a chart showing the timing of interface-side and drive-side command processing and transfer in read operations of the above described disk drive apparatus.

FIG. 6 is a chart showing the timing of interface-side and drive-side command processing and transfer in queued random operations. This figure shows a read operation in a multi-drive environment.

A read operation is processed as shown in FIG. 6. Conventionally, for particular command processing, after processing of command 1 (CMD1), for example, has ended on both the interface side and the drive side, drive-side processing of the following command 2 (CMD2) is executed. In the present embodiment, interface-side processing and drive-side processing are separated, and command processing has been modified to enable drive-side processing to be started even if interface-side processing and drive-side processing have not both finished. In this case, when command 1 processing ends on the drive side, command 2 processing is executed on the drive side without regard to interface-side data transfer processing. In order to implement this, a plurality of buffers for commands (segment buffers) are provided. Normally, there is one segment buffer for one command, but in the present embodiment a plurality of segment buffers are provided for one command, so that the case where only drive-side processing proceeds can also be handled. In hardware, these segment buffers are secured in a prescribed area of RAM 18 (FIG. 1).

As shown in the read operation in a multi-drive environment in FIG. 6, if the bus is not free when data read from the disk by command 1 (CMD1) on the drive side is about to start being transferred by CMD1 on the interface side, CMD1 data transfer will be delayed by time A (see FIG. 6a.), the interval before the bus becomes free. However, in the present embodiment, due to the fact that interface-side processing and drive-side processing are separate, the start of next command (CMD2) drive-side processing is at the end of CMD1 drive-side processing, as shown in FIG. 6b. That is, the start of next command (CMD2) drive-side processing is performed independently on the drive side without regard to the end of CMD1 interface-side processing. As a result, drive-side processing for CMD2 is started without delay due to the above described time A, and so the command processing determined by RPO is executed without latency, as shown in FIG. 6c.

Figure 14:
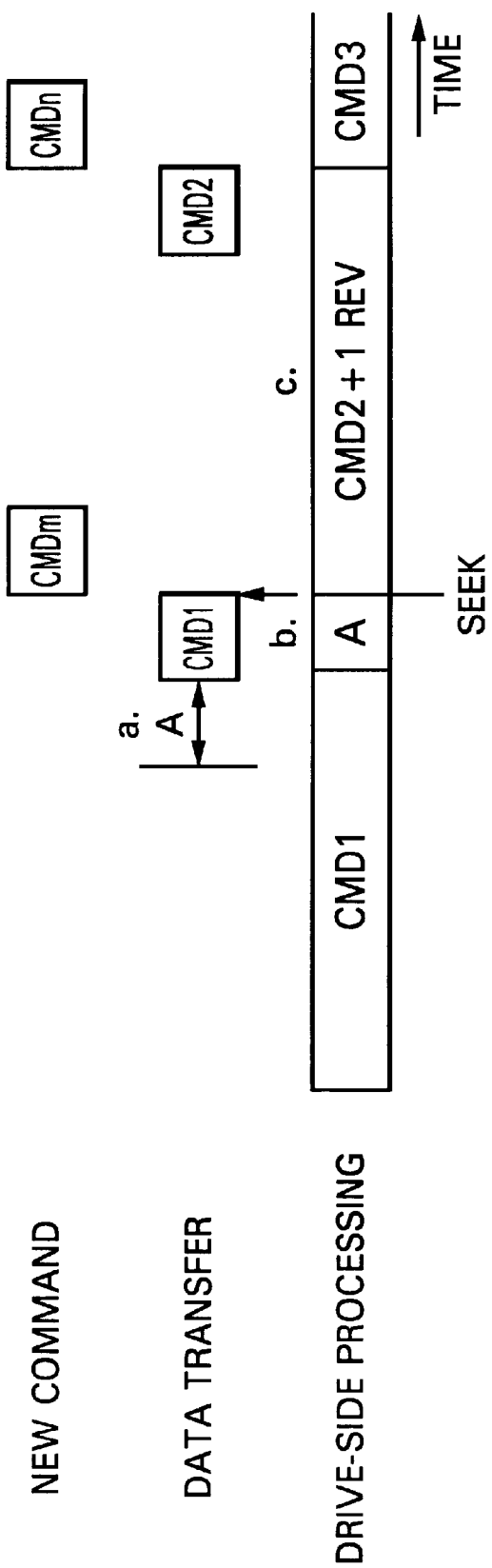
FIG. 14 is a chart showing the timing of interface-side and drive-side command processing and transfer in read operations in the conventional disk drive apparatus.
Figure 15:
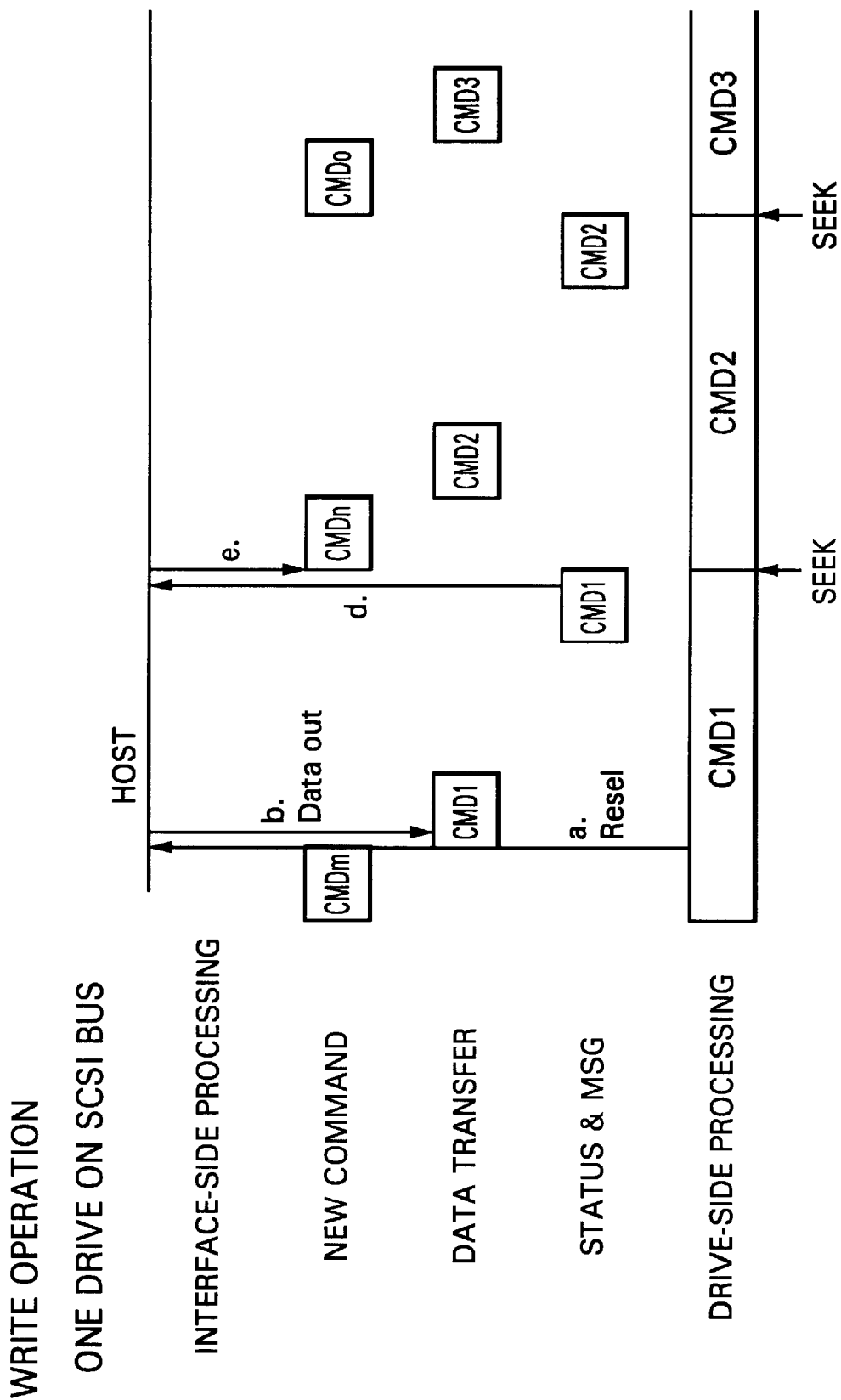
FIG. 15 is a chart showing the timing of interface-side and drive-side command processing and transfer in write operations in the conventional disk drive apparatus.

The above described read operation will now be described in further detail, by contrasting it with the conventional example in FIG. 14.

In the conventional example, if the bus is not free when data read from the disk by command 1 (CMD1) is about to start being transferred by CMD1 on the interface side, the start of drive-side processing of the next command, CMD2, is delayed by time A due to the wait for the end of CMD1 interface-side processing, as shown in FIG. 14b. In contrast, in the present embodiment, the start of next command (CMD2) drive-side processing is executed as scheduled at the end of CMD1 drive-side processing, as shown in FIG. 6b.

In this case, transfer of data to be sent to the host by CMD1 on the interface side is delayed by time A in the same way as in the conventional example, but this has no effect on the command processing determined by RPO. Regarding data transfer to the host, how long time A will be according to the bus use situation cannot be predicted because of the operation of other disk drive apparatuses. For this reason, conventionally, the start of drive-side processing may be held up indefinitely because interface-side processing has not ended. In the present embodiment, data stored in a buffer on the interface side need only be transferred when the bus becomes free, and this data transfer time can be ignored in comparison with the delay when latency is involved.

As described above, a disk drive apparatus according to the first embodiment comprises an HIC 1 that performs host interface peripheral processing by means of hardware; a drive apparatus 2 that controls HDD drive operations, including HDC control; and a microprogram comprising an interface event handler 3 that processes events from the HIC 1, and conveys those events to queue handler 7 or interface handler 8; a queue handler 7 that stores commands issued by the host in a queue area, performs reordering so that the command list is executed most efficiently and speedily, determines the command to be executed, and requests execution of the determined command; an interface handler 8 that executes interface-side processing, including data transfer between the host and drive apparatus 2 by means of a command for which execution has been requested; a drive handler 9 that executes drive-side processing by means of a command for which execution has been requested, and requests the drive apparatus 2 to perform command execution related read/write operations; and a drive event handler 6 that processes events from the HDC of drive apparatus 2, and conveys events to drive handler 9; wherein interface-side processing and drive-side processing are separated with regard to command processing, and interface-side processing does not affect the start of drive-side processing, enabling the latency that may occur in a multi-drive environment to be prevented, and performance to be improved.

That is to say, in the present embodiment, in a read operation, when interface handler 8 is about to execute interface-side processing by means of CMD1, drive handler 9 starts CMD2 processing at the end of CMD1 drive-side processing without regard to execution of interface handler 8 processing, so that the command processing determined by RPO is executed without latency, as shown in FIG. 6c.

In the first embodiment, the case has been described where the bus occupancy time of another disk drive apparatus is within the processing time for one command. However, based on the same concept, by increasing the number of cache segments, delay due to latency can be decreased even when the bus occupancy time extends over the time required to process a number of commands. An example in which the number of cache segments is increased will be described below.

The configuration of a disk drive apparatus according to the second embodiment of the present invention is the same as that in the above described FIGS. 1 and 2. In the second embodiment, as the bus occupancy time of another disk drive apparatus may extend over the time required to process a number of commands, of a particular disk drive apparatus the configuration includes a plurality of cache segments. In hardware, these cache segments are secured in a prescribed area of the RAM 18.

Figure 7:
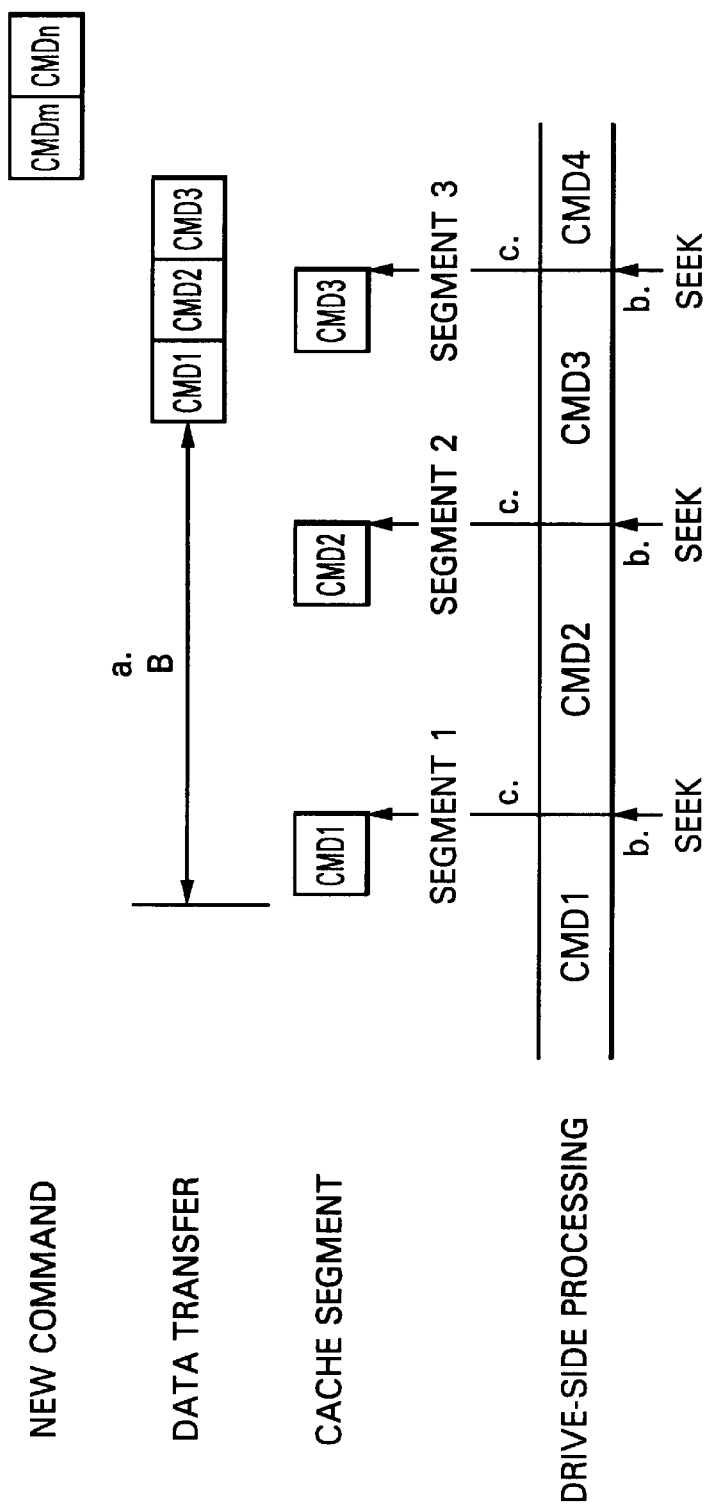
FIG. 7 is a chart showing the timing of interface-side and drive-side command processing and transfer in read operations in a disk drive apparatus according to a second embodiment to which the present invention is applied.

When the bus occupancy time of another disk drive apparatus extends over the time required to process a number of commands, queued random operations are processed as shown in FIG. 7.

FIG. 7 is a chart showing the timing of interface-side and drive-side command processing and transfer in queued random operations. This figure shows a read operation in a multi-drive environment.

A plurality of cache segments are provided in order to execute drive-side processing without delay.

As shown in FIG. 7, when data transfer by commands 1 to 3 (CMD1 to CMD3) on the interface side is about to start for data read from the disk by CMD1 to CMD3 on the drive side, if the bus is not free for the time required to process a number of commands, CMD1 to CMD3 data transfer is delayed by time B (see FIG. 7a.), the interval before the bus becomes free.

In this case too, since, in the present embodiment, interface-side processing and drive-side processing are separate, a plurality of cache segments SEGMENT 1 to SEGMENT 3 are provided, and data is cached in cache segments SEGMENT 1 to SEGMENT 3 by CMD1 to CMD3, the start of next command CMD drive-side processing can be at the end of the drive-side processing of each command CMD, as shown in FIG. 7b. Then, in drive-side processing, data is read successively into cache segments SEGMENT 1 to SEGMENT 3, as shown in FIG. 7c. In interface-side processing, after the bus becomes free, the data of commands CMD1 to CMD3 is transferred from cache segments SEGMENT 1 to SEGMENT 3.

By this means, drive-side processing for CMD1 to CMD3 is started without delay due to the above described time B, and so the command processing determined by RPO is executed without latency. Also, the delay due to latency can be decreased even if the bus occupancy time of another disk drive apparatus extends over the time required to process a number of commands, as shown in FIG. 7.

As described above, a disk drive apparatus according to the second embodiment comprises a plurality of cache segments SEGMENT 1 to SEGMENT 3 that store data read from the disk by execution of commands CMD1 to CMD3, and is configured in such a way that drive handler 9 stores data read from the disk by command execution in the plurality of cache segments SEGMENT 1 to SEGMENT 3 and executes drive-side processing, and interface handler 8 performs interface-side processing for data stored in the plurality of cache segments SEGMENT 1 to SEGMENT 3; so that the delay B due to latency can be decreased even if the bus occupancy time extends over the time required to process multiple commands CMD1 to CMD3, as shown in FIG. 7.

In particular, even when it is not possible to predict the time during which the bus cannot be used due to the operation of other hard disk apparatuses connected to the bus, data caching will have been completed beforehand on the drive side by means of processing of a number of commands, and therefore interface-side processing (data transfer) can be executed as soon as the bus becomes free.

In the above described embodiments, read operations in a multi-drive environment have been described, but with write operations also, the delay due to latency can be decreased by separating the interface-side processing and drive-side processing. An example of such a write operation will be described below.

The configuration of a disk drive apparatus according to the third embodiment of the present invention is the same as that in the above described FIGS. 1 and 2. In the present embodiment, as the bus occupancy time of another disk drive apparatus may extend over the time required to process a number of commands of a particular disk drive apparatus, the configuration includes a plurality of cache segments. In hardware, these cache segments are secured in a prescribed area of the RAM 18.

The basic concept relating to write operations will now be described below.

Figure 16:
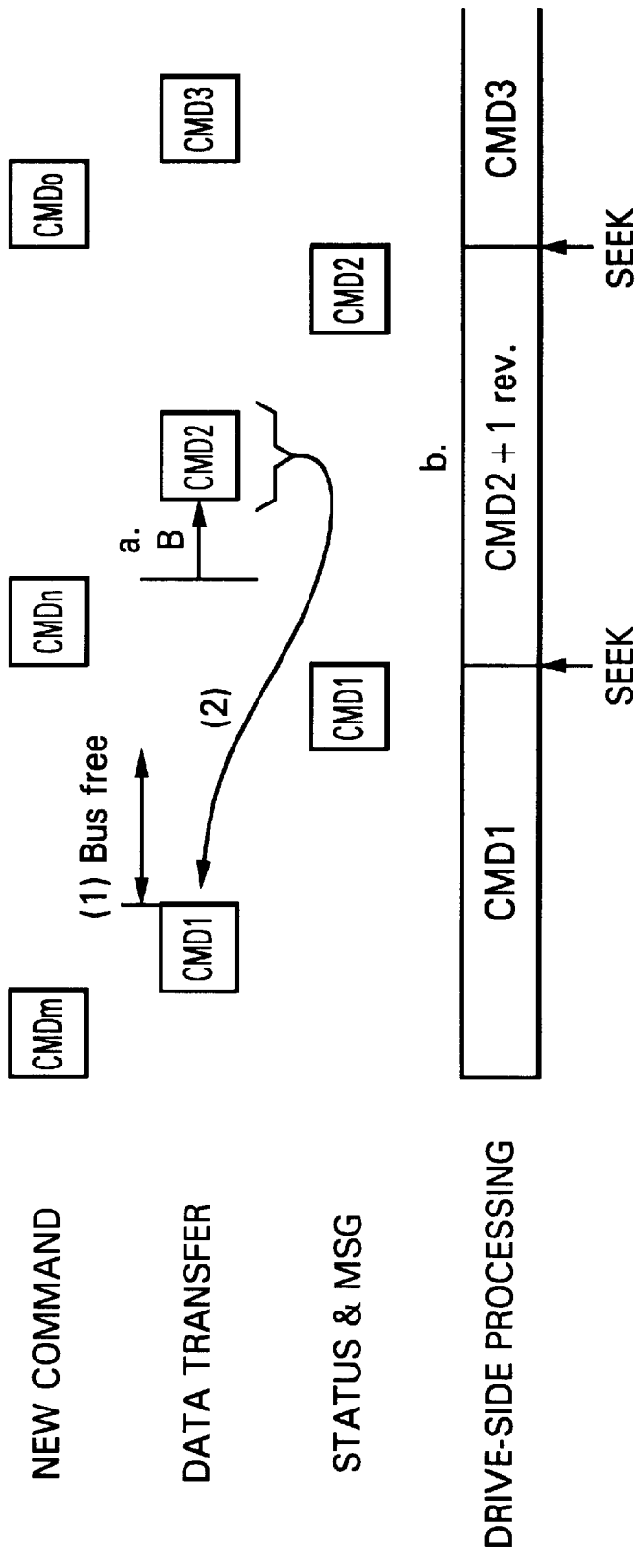
FIG. 16 is a chart showing the timing of interface-side and drive-side command processing and transfer in write operations in the conventional disk drive apparatus.

Conventionally, as shown in the above described FIG. 16, if the bus is not free when data transfer is about to be started by command 2 (CMD2) on the interface side, CMD2 data transfer is delayed by time B (see FIG. 16a.), the interval before the bus becomes free, and the start of command CMD2 drive-side processing waits for the start of CMD2 interface-side processing as shown in FIG. 16b., and so is delayed by time B.

The present inventions aim to enable drive-side processing to be executed as long as data transfer has been performed, even if the bus is not free, and also involve the idea that, since the next command CMD2 is determined during reordering of the preceding command CMD1, the next command has been determined and data transfer is possible as soon as the command is determined. As it is known which command is to be executed, during this period the bus is free and the host side is idle. For example, as the bus is free at position (1) in the above described FIG. 16, data transfer for the next command CMD2 is moved up to just after CMD1 data transfer as shown in FIG. 16 (2). That is, the data is cached and data transfer itself is put first. Thus, as the data for command processing is secured before execution of drive-side processing by the command, there is no delay whatsoever. Actual status return is performed when the respective drive processing ends.

Figure 8:
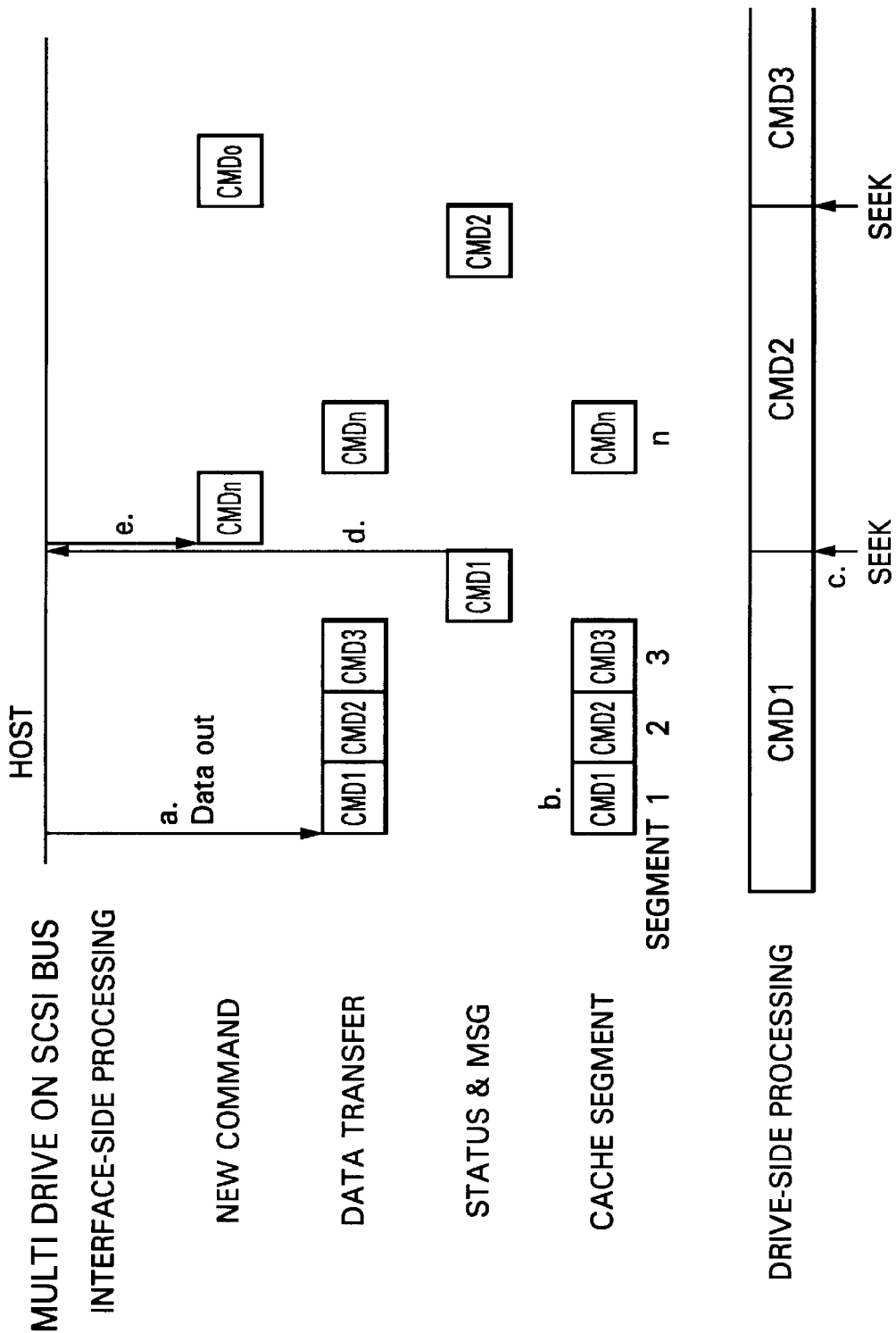
FIG. 8 is a chart showing the timing of interface-side and drive-side command processing and transfer in write operations in a disk drive apparatus according to a third embodiment to which the present invention is applied.
Figure 9:
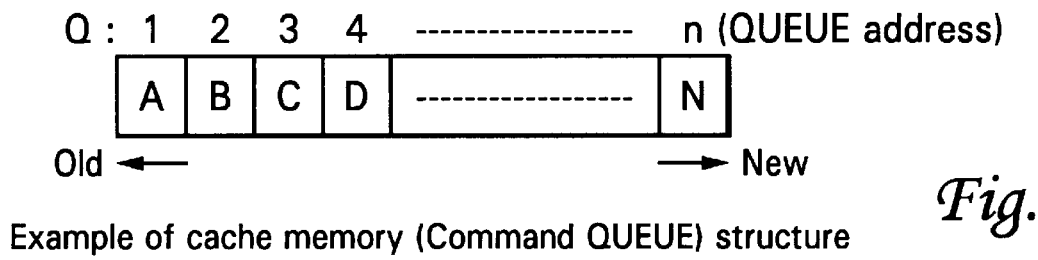
FIG. 9 is a drawing showing the structure of the cache memory command queue of a conventional disk drive apparatus.

FIG. 8 is a chart showing the timing of interface-side and drive-side command processing and transfer executed in queued random operations in accordance with the above described basic concept. This figure shows a write operation in a multi-drive environment.

As shown in FIG. 8, when a number of write commands are queued, as regards interface-side processing, data transfer is started without regard to drive-side processing or command processing determined by RPO (see FIG. 8a.), and the data to be written is stored in cache segments SEGMENT 1 to SEGMENT 3 as shown in FIG. 8b. Here, data transfer of commands CMD1 to CMD3 is performed, and the data is cached in segments SEGMENT 1 to SEGMENT 3.

In drive-side processing, a seek is performed for the data transferred to cache segments SEGMENT 1 to SEGMENT 3 in the command processing order determined by RPO as shown in FIG. 8c, and after a latency wait, the data is written to the disk. When data writing ends, an end status for the relevant command (here, CMD1) and a status message are sent to the host as shown in FIG. 8d. The host issues a new command (here, CMDn) (see FIG. 8e.). Reordering for the next command ends and a new command (here, CMDn) is decided.

Consequently, even if command CMDn data transfer is delayed because the bus is occupied by another disk drive apparatus, for example, drive-side processing is not affected and can still be executed.

As described above, a disk drive apparatus according to the third embodiment comprises a plurality of cache segments SEGMENT 1 to SEGMENT 3 that store data to be written to the disk by execution of commands CMD1 to CMD3, and is configured in such a way that the interface handler 8 starts data transfer to the plurality of cache segments SEGMENT 1 to SEGMENT 3 without regard to the processing situation of the drive handler 9 or the command processing order determined by RPO, the drive handler 9 writes write data that has been transferred to the plurality of cache segments SEGMENT 1 to SEGMENT 3 to the disk by command execution and executes drive-side processing, and at the end of writing to the disk by execution of the relevant command, a command end status is sent to the host, so that, in write operations, the delay due to latency can be decreased and performance can be improved.

Moreover, even when it is not possible to predict the time during which the bus cannot be used due to the operation of other hard disk apparatuses connected to the bus, the fact that the interface handler 8 transfers data to cache segments SEGMENT 1 to SEGMENT 3 in advance when the bus becomes free enables processing delays due to bus occupancy to be minimized on the drive side.

In the above described embodiments, examples have been described in which the disk drive apparatus is applied to an HDD, but this is not a limitation, and the present invention can be applied to any kind of apparatus. as long as it is a disk drive apparatus in which interface-side processing and drive-side processing are separated with regard to command processing. The present invention can also be used in disk drive apparatuses other than HDDs, such as magneto-optical disk drives, for example, and the same kind of advantages can be obtained as in the above described embodiments.

Further, in the above described embodiments, the descriptions relate to a multi-drive environment in which two or more hard disk apparatuses are connected to a SCSI bus, but the bus can be of any kind, and, as long as they are devices that occupy the bus and perform data transfer between the host and peripherals, etc., the peripheral devices are not limited to the above described disk drive apparatuses.

Still further, in the above described embodiments, interface-side processing and drive-side processing are implemented by means of software processing by a microprogram, but the processing example is only one example, and this processing can also be implemented by means of a hardware configuration.

Moreover, it goes without saying that the type, quantity, etc., of the HDCs, cache segments, HICs, etc., that are components of the above described disk drive apparatus, the command issuance method, and so forth, are not limited to the above described embodiments.

A disk drive apparatus and control method thereof according to the present invention comprise: interface processing means that executes interface-side processing including data transfer between a host and a drive controller by means of commands for which execution is requested; and drive processing means that requests the drive controller to perform read/write operations relating to command execution; and perform interface-side processing and drive-side processing separately with regard to command processing, enabling the latency that may occur in a multi-drive environment to be prevented, and performance to be improved.

While the invention has been particularly shown and described with reference to a preferred embodiment, it will be understood by those skilled in the art that various changes in form and detail may be made therein without departing from the spirit and scope of the invention.

What is claimed is:

1. A multi-drive storage system comprising a host and a plurality of disk drives connected by a bus, wherein data transfer is performed via the bus from one of the disk drives to another of the disk drives or the host, at least one of the disk drives comprising:

a drive controller that controls operations such as reading/writing or the like of data from/to a storage medium;

a host interface controller that performs data transfer between the host and the drive controller by means of hardware; and a command manager that stores in a queue area a plurality of commands issued by the host, performs reordering so that a command list is executed most efficiently and speedily, determines the command to be executed, and requests execution of the determined command;

and further comprising:

interface processing means for executing interface-side processing including data transfer between the host and said drive controller by means of commands for which execution has been requested wherein said data transfer is executed without regard to a command processing order determined by said command manager; and drive processing means for executing drive-side processing by means of commands for which execution has been requested, and issues requests to said drive controller for reading/writing related to command execution;

wherein interface-side processing and drive-side processing are performed separately with regard to command processing.

2. The multi-drive storage system according to claim 1, wherein interface-side processing does not affect the start of drive-side processing.

3. The multi-drive storage system according to claim 1, wherein:

when said interface processing means is about to execute interface-side processing according to a first command, said drive processing means starts processing of a second command at the end of drive-side processing of the first command, without regard to execution of processing by said interface processing means.

4. The multi-drive storage system according to claim 1, comprising:

a plurality of cache segment buffers that store data read from said disk-shaped storage medium by execution of a plurality of commands;

wherein:

said drive processing means stores data read from said disk-shaped storage medium by command execution in a plurality of cache segment buffers, and executes drive-side processing; and said interface processing means executes interface-side processing on data stored in a plurality of cache segment buffers.

5. The multi-drive storage system according to claim 1, comprising a plurality of cache segment buffers that store data to be written to said disk-shaped storage medium by execution of a plurality of commands;

wherein:

said interface processing means starts data transfer to a plurality of cache segment buffers without regard to the processing situation of said drive processing means; and said drive processing means writes write data, that has been transferred to a plurality of cache segment buffers, to said disk-shaped storage medium by means of command execution, and executes drive-side processing.

6. The multi-drive storage system according to claim 1, comprising:

a plurality of cache segment buffers that store data to be written to said disk-shaped storage medium by execution of a plurality of commands;

wherein:

said interface processing means starts data transfer to a plurality of cache segment buffers without regard to the command processing order determined by said command manager; and said drive processing means writes write data, that has been transferred to a plurality of cache segment buffers, to a disk-shaped storage medium in the command processing order determined by said command manager, and executes drive-side processing.

7. The multi-drive storage system according to claim 1, wherein said interface-side processing executed by said interface processing means is data transfer.

8. The multi-drive storage system according to claim 1, wherein the drive-side processing executed by said drive processing means is read/write processing on a disk-shaped storage medium.

9. The multi-drive storage system according to claim 1, wherein the drive-side processing executed by said drive processing means is processing to write data to a plurality of cache segment buffers, or processing to read data from a plurality of cache segment buffers.

10. The multi-drive storage system according to claim 1, wherein a plurality of commands issued by the host are stored in a queue area, and queued random operations that execute commands are performed.

11. The multi-drive storage according to claim 1, wherein:
a plurality of commands issued by the host are stored in a queue area, queued random operations that execute commands are performed, and the order of the commands executed in said queued random operations is determined by RPO (rotational position optimization) that changes the command execution order so that the command list is executed most efficiently and speedily.

12. In a method of controlling a disk drive apparatus, including a command manager that stores in a queue area a plurality of commands issued by the host, performs reordering so that the command list is executed most efficiently and speedily, determines the command to be executed, and requests execution of the determined command; interface processing means that executes interface-side processing by means of commands for which execution has been requested; and drive processing means that executes drive-side processing by means of commands for which execution has been requested;
a method comprising, in the queued random write operation that executes write commands:
starting within said interface processing means data transfer to a plurality of cache segment buffers without regard to a processing situation of said drive-side processing means;
writing utilizing said drive processing means and without regard to a command processing order determined by said command manager write data, that has been transferred to a plurality of cache segment buffers, to a disk-shaped storage medium by means of command execution, and executing drive-side processing; and
sending a command end status to the host when writing to the disk-shaped storage medium by means of said command execution ends.

13. In a method a disk drive apparatus including a command manager that stores in a queue area a plurality of commands issued by the host, performs reordering so that the command list is executed most efficiently and speedily, determines the command to be executed, and requests execution of the determined command; interface processing means that executes interface-side processing by means of commands for which execution has been requested; and drive processing means that executes drive-side processing by means of commands for which execution has been requested;
a method comprising in a queued random write operation that executes write commands:
starting within said interface processing means data transfer to a plurality of cache segment buffers without regard to a command processing order determined by said command manager;
writing utilizing said drive processing means write data, that has been transferred to a plurality of cache segment buffers, to a disk-shaped storage medium in the command processing order determined by said command manager, and executing drive-side processing; and
sending a command end status to the host when writing to the disk-shaped storage medium by means of said command execution ends.

* * * * *